United States Patent
Hamer et al.

(10) Patent No.: US 7,079,675 B2
(45) Date of Patent: Jul. 18, 2006

(54) HISTOLOGICAL ASSESSMENT

(75) Inventors: Michael J Hamer, Hereford (GB); Maria Petrou, Guildford (GB); Anastasios Kesidis, Sevastopoulou (GR); Margaret Varga, Malvern (GB)

(73) Assignee: QinetiQ Limited, London (GB)

(*) Notice: Subject to any disclaimer, the term of this patent is extended or adjusted under 35 U.S.C. 154(b) by 0 days.

(21) Appl. No.: 10/524,492

(22) PCT Filed: Aug. 8, 2003

(86) PCT No.: PCT/GB03/03465

§ 371 (c)(1),
(2), (4) Date: Feb. 14, 2005

(87) PCT Pub. No.: WO2004/017052

PCT Pub. Date: Feb. 26, 2004

(65) Prior Publication Data

US 2005/0276457 A1    Dec. 15, 2005

(30) Foreign Application Priority Data

Aug. 15, 2002 (GB) ................. 0218909.0
Aug. 19, 2002 (GB) ................. 0219271.4
Sep. 23, 2002 (GB) ................. 0222035.8
Sep. 25, 2002 (GB) ................. 0222218.0

(51) Int. Cl.
  *G06K 9/00* (2006.01)
(52) U.S. Cl. ............. 382/128; 435/7.8; 435/336; 530/389.2; 128/922
(58) Field of Classification Search ........... 382/128, 382/133; 435/7.23, 7.8, 336; 377/10; 128/922; 530/389.2
See application file for complete search history.

(56) References Cited

U.S. PATENT DOCUMENTS

| 4,768,089 A | | 8/1988 | Kato | |
| 5,202,931 A | * | 4/1993 | Bacus | 382/133 |
| 5,410,250 A | * | 4/1995 | Brown | 324/309 |
| 5,485,527 A | * | 1/1996 | Bacus et al. | 382/128 |

(Continued)

FOREIGN PATENT DOCUMENTS

JP    060319737    11/1994

(Continued)

OTHER PUBLICATIONS

International Search Report.

(Continued)

*Primary Examiner*—Jingge Wu
*Assistant Examiner*—Anand Bhatnagar
(74) *Attorney, Agent, or Firm*—Nixon & Vanderhye P.C.

(57) ABSTRACT

A method of measuring oestrogen or progesterone receptor (ER or PR) comprises identifying in histopathological specimen image data pixel groups indicating cell nuclei, and deriving image hue and saturation. The image is thresholded using hue and saturation and preferentially stained cells identified. ER or PR status is determined from normalised average saturation and proportion of preferentially stained cells. A method of measuring C-erb-2 comprises correlating window functions with pixel sub-groups to identify cell boundaries, computing measures of cell boundary brightness and sharpness and brightness extent around cell boundaries, and comparing the measures with comparison images associated with different values of C-erb-2. A C-erb-2 value associated with a comparison image having similar brightness-related measures is assigned. A method of measuring vascularity comprises deriving image hue and saturation, producing a segmented image by hue and saturation thresholding and identifying contiguous pixels. Vascularity is determined from contiguous pixel area corresponding to vascularity expressed as a proportion of total image area.

31 Claims, 5 Drawing Sheets

U.S. PATENT DOCUMENTS

| | | | |
|---|---|---|---|
| 6,151,405 A | 11/2000 | Douglass et al. | |
| 6,215,892 B1 | 4/2001 | Douglass et al. | |
| 6,330,349 B1 | 12/2001 | Hays et al. | |
| 6,404,916 B1 | 6/2002 | De La Torre-Bueno | |
| 6,546,123 B1* | 4/2003 | McLaren et al. | 382/128 |
| 2001/0044124 A1 | 11/2001 | Bacus | |
| 2001/0049114 A1 | 12/2001 | Bacus | |
| 2002/0039434 A1 | 4/2002 | Levin | |
| 2003/0231791 A1* | 12/2003 | Torre-Bueno et al. | 382/133 |
| 2004/0066960 A1* | 4/2004 | McLaren et al. | 382/128 |
| 2004/0071327 A1* | 4/2004 | Ellis et al. | 382/128 |
| 2004/0120562 A1* | 6/2004 | Hays et al. | 382/128 |
| 2005/0276457 A1* | 12/2005 | Hamer et al. | 382/133 |

FOREIGN PATENT DOCUMENTS

| | | |
|---|---|---|
| WO | 99/44062 A1 | 9/1999 |
| WO | 00/78361 A2 | 12/2000 |
| WO | 01/004828 A | 1/2001 |
| WO | 01/42796 A1 | 6/2001 |
| WO | 01/98774 A2 | 12/2001 |
| WO | 02/082988 A2 | 10/2002 |

OTHER PUBLICATIONS

GB Search Report.

* cited by examiner

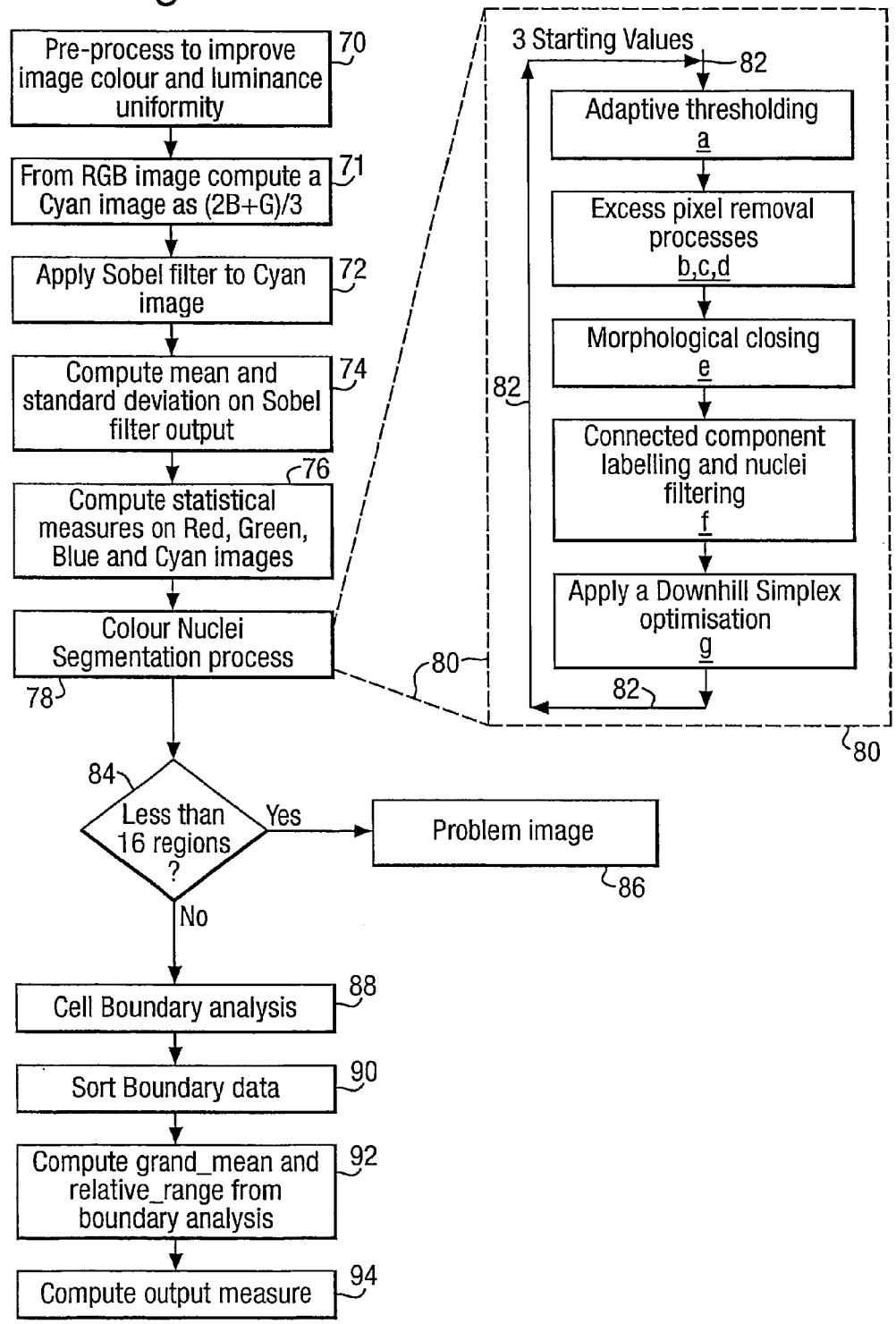

HISTOLOGICAL ASSESSMENT

This application is the U.S. national phase of international application PCT/GB2003/003465 filed 8 Aug. 2003 which designated the U.S. and claims priority of GB 0218909.0, filed 15 Aug. 2002; GB 0219271.4, filed 19 Aug. 2002; GB 0222035.8, filed 23 Sep. 2002; and GB 0222218.0, filed 25 Sep. 2002, the entire contents of each of which are hereby incorporated by reference.

This invention relates to a method, a computer program and an apparatus for histological assessment, and more particularly for making measurements upon histological imagery to provide clinical information on potentially cancerous tissue such as for example (but not exclusively) breast cancer tissue.

Breast cancer is a common form of female cancer: once a lesion indicative of breast cancer has been detected, tissue samples are taken and examined by a histopathologist to establish a diagnosis, prognosis and treatment plan. However, pathological analysis of tissue samples is a time consuming and inaccurate process. It entails interpretation of colour images by human eye, which is highly subjective: it is characterised by considerable inaccuracies in observations of the same samples by different observers and even by the same observer at different times. For example, two different observers assessing the same ten tissue samples may easily give different opinions for three of the slides –30% error. The problem is exacerbated by heterogeneity, i.e. complexity of some tissue sample features. Moreover, there is a shortage of pathology staff.

Oestrogen and progesterone receptor (ER and PR) status, C-erb-2 and vascularity are parameters which are data of interest for assisting a clinician to formulate a diagnosis, prognosis and treatment plan for a patient. C-erb-2 is also known as Cerb-B2, her-2, her-2/neu and erb-2.

It is an object of the invention to provide a technique for objective measurement of at least one of ER status, PR status, C-erb-2 and vascularity.

In a first aspect, the present invention provides a method of measuring oestrogen or progesterone receptor (ER or PR) status having the steps of:
  a) obtaining histopathological specimen image data; and
  b) identifying in the image data groups of contiguous pixels corresponding to respective cell nuclei;

characterised in that the method also includes the steps of:
  c) deriving hue and saturation for the image data in a colour space having a hue coordinate and a saturation coordinate;
  d) thresholding the image data on the basis of hue and saturation and identifying pixels corresponding to cells which are preferentially stained relative to surrounding specimen tissue; and
  e) determining ER or PR status from proportion of pixels corresponding to preferentially stained cells.

The invention provides the advantage that it is computer-implementable, and hence is carried out in a way which avoids the subjectivity of a manual inspection process.

In an alternative first aspect, the invention may provide a method of measuring ER or PR status having the steps of:
  a) obtaining histopathological specimen image data; and
  b) identifying in the image data groups of contiguous pixels corresponding to respective cell nuclei;

characterised in that the method also includes the steps of:
  c) deriving hue and saturation for the image data in a colour space having a hue coordinate and a saturation coordinate;
  d) thresholding the image data on the basis of hue and saturation and identifying pixels corresponding to cells which are preferentially stained relative to surrounding specimen tissue; and
  e) determining ER or PR status from normalised average saturation.

In a further alternative first aspect, the invention may provide a method of measuring ER or PR status having the steps of:
  a) obtaining histopathological specimen image data; and
  b) identifying in the image data groups of contiguous pixels corresponding to respective cell nuclei;

characterised in that the method also includes the steps of:
  c) deriving hue and saturation for the image data in a colour space having a hue coordinate and a saturation coordinate;
  d) thresholding the image data on the basis of hue and saturation and identifying pixels corresponding to cells which are preferentially stained relative to surrounding specimen tissue; and
  e) determining ER or PR status from normalised average saturation and fraction of pixels corresponding to preferentially stained cells.

Step b) may implemented using a K-means clustering algorithm employing a Mahalanobis distance metric.

Step c) may be implemented by transforming the image data into a chromaticity space, and deriving hue and saturation from image pixels and a reference colour. Hue may be obtained from an angle $\phi$ equal to $\sin^{-1}$ $$\frac{|\tilde{x}y - x\tilde{y}|}{\sqrt{\tilde{x}^2 + \tilde{y}^2}\sqrt{x^2 + y^2}}$$

and saturation from an expression $$\frac{x\tilde{x} + y\tilde{y}}{\tilde{x}^2 + \tilde{y}^2},$$

where $(x, y)$ and $(\tilde{x}, \tilde{y})$ are respectively image pixel coordinates and reference colour coordinates in the chromaticity space. It may be adapted to lie in the range 0 to 90 degrees and a hue threshold of 80 degrees may be set in step d). A saturation threshold $S_o$ may be set in step d), $S_o$ being 0.9 for saturation in the range 0.1 to 1.9 and 0 for saturation outside this range.

The fraction of pixels corresponding to preferentially stained cells may be determined by counting the number of pixels having both saturation greater than a saturation threshold and hue modulus less than a hue threshold and expressing such number as a fraction of a total number of pixels in the image: it may be awarded a score 0, 1, 2, 3, 4 or 5 according respectively to whether it is (i) 0, (ii) >0 and <0.01, (iii) $\geq 0.01$ and $\leq 0.10$, (iv) $\geq 0.11$ and <0.33, (v) $\geq 0.34$ and $\leq 0.66$ or (vi) $\geq 0.67$ and $\leq 1.0$.

Normalised average saturation may be accorded a score 0, 1, 2 or 3 according respectively to whether it is (i) $\leq 25\%$, (ii) >25% and $\leq 50\%$, (iii) >50% and $\leq 75\%$ or (iv) >75% and $\leq 100\%$.

Scores for normalised average saturation and fraction of pixels corresponding to preferentially stained cells may be added together to provide a measurement of ER or PR.

The method of the invention may include measuring C-erb-2 status by the following steps:
 a) correlating window functions of different lengths with pixel sub-groups within the identified contiguous pixels groups to identify pixels associated with cell boundaries,
 b) computing brightness-related measures of cell boundary brightness and sharpness and brightness extent around cell boundaries from pixels corresponding to cell boundaries,
 c) comparing the brightness-related measures with predetermined equivalents obtained from comparison images associated with different values of C-erb-2, and
 d) assigning to the image data a C-erb-2 value which is that associated with the comparison image having brightness-related measures closest to those determined for the image data.

The method of the invention may include measuring vascularity by the following steps:
 a) deriving hue and saturation for the image data in a colour space having a hue coordinate and a saturation coordinate;
 b) producing a segmented image by thresholding the image data on the basis of hue and saturation;
 c) identifying in the segmented image groups of contiguous pixels; and
 d) determining vascularity from the total area of the groups of contiguous pixels which are sufficiently large to correspond to vascularity, such area being expressed as a proportion of the image data's total area.

In a second aspect, the invention provides a method of measuring C-erb-2 status having the steps of:
 a) obtaining histopathological specimen image data; and
 b) identifying in the image data contiguous pixel groups corresponding to respective cell nuclei associated with surrounding cell boundary staining;
 c) characterised in that the method also includes the steps of:
 d) correlating window functions of different lengths with pixel sub-groups within the identified contiguous pixels groups to identify pixels associated with cell boundaries,
 e) computing brightness-related measures of cell boundary brightness and sharpness and brightness extent around cell boundaries from pixels corresponding to cell boundaries,
 f) comparing the brightness-related measures with predetermined equivalents obtained from comparison images associated with different values of C-erb-2, and
 g) assigning to the image data a C-erb-2 value which is that associated with the comparison image having brightness-related measures closest to those determined for the image data.

In this aspect, at least some of the window functions may have non-zero values of 6, 12, 24 and 48 pixels respectively and zero values elsewhere. Pixels associated with a cell boundary are identified from a maximum correlation with a window function, the window function having a length which provides an estimate of cell boundary width.

The brightness-related measure of cell boundary brightness and sharpness may be computed in step d) using a calculation including dividing cell boundaries by their respective widths to provide normalised boundary magnitudes, selecting a fraction of the normalised boundary magnitudes each greater than unselected equivalents and summing the normalised boundary magnitudes of the selected fraction.

In step d) a brightness-related measure of brightness extent around cell boundaries may be computed using a calculation including dividing normalised boundary magnitudes into different magnitude groups each associated with a respective range of magnitudes, providing a respective magnitude sum of normalised boundary magnitudes for each magnitude group, and subtracting a smaller magnitude sum from a larger magnitude sum.

The comparison image having brightness-related measures closest to those determined for the image data may be determined from a Euclidean distance between the brightness-related measures of the comparison image and the image data.

In step b) identifying in the image data contiguous pixel groups corresponding to respective cell nuclei is carried out by an adaptive thresholding technique arranged to maximise the number of contiguous pixel groups identified. For image data including red, green and blue image planes the adaptive thresholding technique may include:
 a) generating a mean value $\mu_R$ and a standard deviation $\sigma_R$ for pixels in the red image plane,
 b) generating a cyan image plane from the image data and calculating a mean value $\mu_C$ for its pixels,
 c) calculating a product $CMM\mu_C$ where CMM is a predetermined multiplier,
 d) calculating a quantity $R_B$ equal to the number of adjacent linear groups of pixels of predetermined length and including at least one cyan pixel which is less than $CMM\mu_C$,
 e) for each red pixel calculating a threshold equal to $\{RMM\mu_R - \sigma_R(4-R_B)\}$ and RMM is a predetermined multiplier,
 f) forming a thresholded red image by discarding each red pixel that is greater than or equal to the threshold,
 g) determining the number of contiguous pixel groups in the thresholded red image,
 h) changing the values of RMM and CMM and iterating steps c) to g),
 i) changing the values of RMM and CMM once more and iterating steps c) to g),
 j) comparing the numbers of contiguous pixel groups determined in steps g) to i), treating the three pairs of values of RMM and CMM as points in a two dimensional space, selecting the pair of values of RMM and CMM associated with the lowest number of contiguous pixel groups, obtaining its reflection in the line joining the other two pairs of values of RMM and CMM, using this reflection as a new pair of values of RMM and CMM and iterating steps c) to g) and this step j).

The first three pairs of RMM and CMM values may be 0.802 and 1.24, 0.903 and 0.903, and 1.24 and 0.802 respectively.

Brown pixels may be removed from the thresholded red image if like-located pixels in the cyan image are less than $CMM\mu_C$; edge pixels may be removed likewise if like-located pixels in a Sobel-filtered cyan image having a standard deviation $\sigma_C$ are greater than $(\mu_C + 1.5\sigma_C)$. Pixels corresponding to lipids may also be removed if their red green and blue pixel values are all greater than the sum of the relevant colour's minimum value and 98% of its range of pixel values in each case.

The thresholded red image may be subjected to a morphological closing operation.

In a third aspect, the present invention provides a method of measuring vascularity having the steps of:
 a) obtaining histopathological specimen image data; characterised in that the method also includes the steps of:

b) deriving hue and saturation for the image data in a colour space having a hue coordinate and a saturation coordinate;

c) producing a segmented image by thresholding the image data on the basis of hue and saturation; and d) identifying in the segmented image groups of contiguous pixels; and e) determining vascularity from the total area of the groups of contiguous pixels which are sufficiently large to correspond to vascularity, such area being expressed as a proportion of the image data's total area.

In this aspect the image data may comprise pixels with red, green and blue values designated R, G and B respectively, characterised in that a respective saturation value S is derived in step b) for each pixel by:

a) defining M and m for each pixel as respectively the maximum and minimum of R, G and B; and b) setting S to zero if m equals zero and setting S to (M−m)/M otherwise.

Hue values designated H may be derived by:

a) defining new values newr, newg and newb for each pixel given by newr=(M−R)/(M−m), newg=(M−G)/(M−m) and newb=(M−B)/(M−m) in order to convert each pixel value into the difference between its magnitude and that of the maximum of the three colour magnitudes of that pixel, this difference being divided by the difference between the maximum and minimum of R, G and B, and b) calculating H as tabulated immediately below:

| M | H |
|---|---|
| 0 | 180 |
| R | 60(newb − newg)* |
| G | 60(2 + newr − newb)* |
| B | 60(4 + newg − newr)* | provided that if H proves to be >360, then 360 is subtracted from it, and if H proves to be <0, 360 is added to it.

The step of producing a segmented image may be implemented by designating for further processing only those pixels having both a hue H in the range 282–356 and a saturation S in the range 0.2 to 0.24. The step of identifying in the segmented image groups of contiguous pixels may include the step of spatially filtering such groups to remove groups having insufficient pixels to contribute to vascularity. The step of determining vascularity may include treating vascularity as having a high or a low value according to whether or not it is at least 31%.

In a fourth aspect, the present invention provides a computer program for measuring ER or PR status, the program being arranged to control computer apparatus to execute the steps of:

a) processing histopathological specimen image data to identify in the image data groups of contiguous pixels corresponding to respective cell nuclei;

characterised in that the program is also arranged to implement the steps of:

b) deriving hue and saturation for the image data in a colour space having a hue coordinate and a saturation coordinate;

c) thresholding the image data on the basis of hue and saturation and identifying pixels corresponding to cells which are preferentially stained relative to surrounding specimen tissue; and d) determining ER or PR status from proportion of pixels corresponding to preferentially stained cells.

In an alternative fourth aspect, the present invention provides a computer program for measuring ER or PR status, the program being arranged to control computer apparatus to execute the steps of:

a) processing histopathological specimen image data to identify in the image data groups of contiguous pixels corresponding to respective cell nuclei;

b) characterised in that the program is also arranged to implement the steps of:

c) deriving hue and saturation for the image data in a colour space having a hue coordinate and a saturation coordinate;

d) thresholding the image data on the basis of hue and saturation and identifying pixels corresponding to cells which are preferentially stained relative to surrounding specimen tissue; and e) determining ER or PR status from normalised average saturation.

In a further alternative fourth aspect, the present invention provides a computer program for measuring ER or PR status, the program being arranged to control computer apparatus to execute the steps of:

a) processing histopathological specimen image data to identify in the image data groups of contiguous pixels corresponding to respective cell nuclei;

characterised in that the program is also arranged to implement the steps of:

b) deriving hue and saturation for the image data in a colour space having a hue coordinate and a saturation coordinate;

c) thresholding the image data on the basis of hue and saturation and identifying pixels corresponding to cells which are preferentially stained relative to surrounding specimen tissue; and d) determining ER or PR status from normalised average saturation and fraction of pixels corresponding to preferentially stained cells.

In a fifth aspect, the present invention provides a computer program for use in measuring C-erb-2 status arranged to control computer apparatus to execute the steps of:

a) processing histopathological specimen image data to identify contiguous pixel groups corresponding to respective cell nuclei associated with surrounding cell boundary staining;

characterised in that the computer program is also arranged to implement the steps of:

b) correlating window functions of different lengths with pixel sub-groups within the identified contiguous pixels groups to identify pixels associated with cell boundaries, c) computing brightness-related measures of cell boundary brightness and sharpness and brightness extent around cell boundaries from pixels corresponding to cell boundaries, d) comparing the brightness-related measures with predetermined equivalents obtained from comparison images associated with different values of C-erb-2, and e) assigning to the image data a C-erb-2 value which is that associated with the comparison image having brightness-related measures closest to those determined for the image data.

In a sixth aspect, the present invention provides a computer program for use in measuring vascularity arranged to control computer apparatus to execute the steps of:
a) using histopathological specimen image data to derive hue and saturation for the image data in a colour space having a hue coordinate and a saturation coordinate;
b) producing a segmented image by thresholding the image data on the basis of hue and saturation; and
c) identifying in the segmented image groups of contiguous pixels; and
f) determining vascularity from the total area of the groups of contiguous pixels which are sufficiently large to correspond to vascularity, such area being expressed as a proportion of the image data's total area.

In a seventh aspect, the present invention provides an apparatus for measuring ER or PR status including means for photographing histopathological specimens to provide image data and computer apparatus to process the image data, the computer apparatus being programmed to identify in the image data groups of contiguous pixels corresponding to respective cell nuclei, characterised in that the computer apparatus is also programmed to execute the steps of:
a) deriving hue and saturation for the image data in a colour space having a hue coordinate and a saturation coordinate;
b) thresholding the image data on the basis of hue and saturation and identifying pixels corresponding to cells which are preferentially stained relative to surrounding specimen tissue; and
c) determining ER or PR status from proportion of pixels corresponding to preferentially stained cells.

In an alternative seventh aspect, the present invention provides an apparatus for measuring ER or PR status including means for photographing histopathological specimens to provide image data and computer apparatus to process the image data, the computer apparatus being programmed to identify in the image data groups of contiguous pixels corresponding to respective cell nuclei, characterised in that the computer apparatus is also programmed to execute the steps of:
a) deriving hue and saturation for the image data in a colour space having a hue coordinate and a saturation coordinate;
b) thresholding the image data on the basis of hue and saturation and identifying pixels corresponding to cells which are preferentially stained relative to surrounding specimen tissue; and
c) determining ER or PR status from normalised average saturation.

In a further alternative seventh aspect, the present invention provides an apparatus for measuring ER or PR status including means for photographing histopathological specimens to provide image data and computer apparatus to process the image data, the computer apparatus being programmed to identify in the image data groups of contiguous pixels corresponding to respective cell nuclei, characterised in that the computer apparatus is also programmed to execute the steps of:
a) deriving hue and saturation for the image data in a colour space having a hue coordinate and a saturation coordinate;
b) thresholding the image data on the basis of hue and saturation and identifying pixels corresponding to cells which are preferentially stained relative to surrounding specimen tissue; and
c) determining ER or PR status from normalised average saturation and fraction of pixels corresponding to preferentially stained cells.

In an eighth aspect, the present invention provides an apparatus for measuring C-erb-2 status including means for photographing histopathological specimens to provide image data and computer apparatus to process the image data, the computer apparatus being programmed to identify in the image data groups of contiguous pixels corresponding to respective cell nuclei, characterised in that the computer apparatus is also programmed to execute the steps of:
a) correlating window functions of different lengths with pixel sub-groups within the identified contiguous pixels groups to identify pixels associated with cell boundaries,
b) computing brightness-related measures of cell boundary brightness and sharpness and brightness extent around cell boundaries from pixels corresponding to cell boundaries,
c) comparing the brightness-related measures with predetermined equivalents obtained from comparison images associated with different values of C-erb-2, and
d) assigning to the image data a C-erb-2 value which is that associated with the comparison image having brightness-related measures closest to those determined for the image data.

In a ninth aspect, the present invention provides an apparatus for measuring vascularity including means for photographing histopathological specimens to provide image data and computer apparatus to process the image data, characterised in that the computer apparatus is also programmed to execute the steps of:
a) deriving hue and saturation for the image data in a colour space having a hue coordinate and a saturation coordinate;
b) producing a segmented image by thresholding the image data on the basis of hue and saturation; and
c) identifying in the segmented image groups of contiguous pixels; and
d) determining vascularity from the total area of the groups of contiguous pixels which are sufficiently large to correspond to vascularity, such area being expressed as a proportion of the image data's total area.

The computer program and apparatus aspects of the invention may have preferred features corresponding to those of respective method aspects.

In order that the invention might be more fully understood, embodiments thereof will now be described, by way of example only, with reference to the accompanying drawings, in which:

FIG. 7 is a block diagram of a process for measuring C-erb-2 in the procedure of FIG. 1.

The examples to be described herein are three different inventions which can be implemented separately or together, because they are all measurements which individually or collectively assist a clinician to diagnose cancer and to formulate a treatment programme. In descending order of importance, the procedures are determination of oestrogen and progesterone receptor status, determination of C-erb-2 and determination of vascularity.

Figure 1:
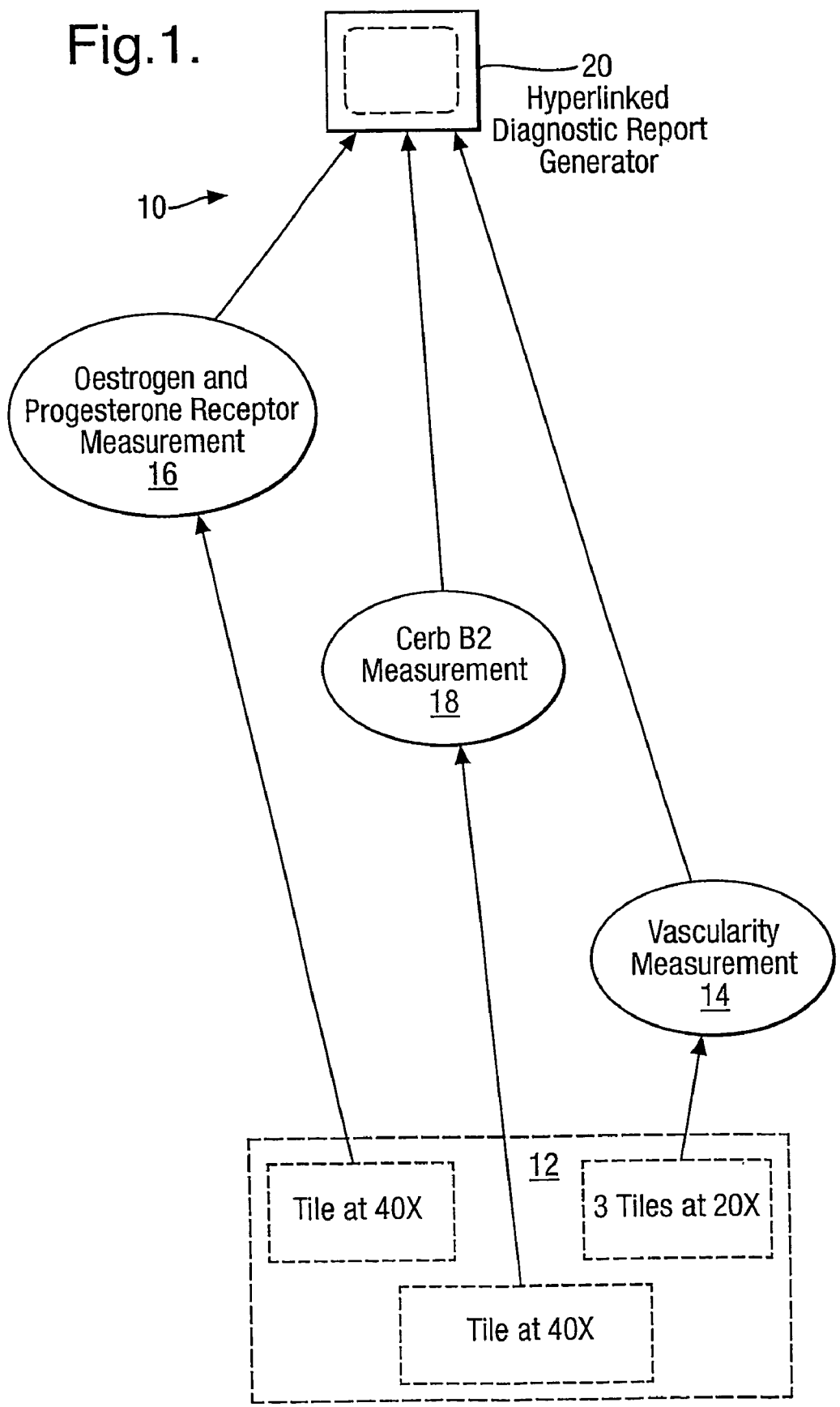
FIG. 1 is a block diagram of a procedure for measuring indications of cancer to assist in formulating diagnosis and treatment.

A procedure 10 for the assessment of tissue samples in the form of histopathological slides of potential carcinomas of the breast is shown in FIG. 1. This drawing illustrates processes which generate measurements of specialised kinds for use by a pathologist as the basis for assessing patient diagnosis, prognosis and treatment plan.

The procedure 10 employs a database which maintains digitised image data obtained from histological slides as will be described later. Sections are taken (cut) from breast tissue samples (biopsies) and placed on respective slides. Slides are stained using a staining agent selected from the following depending on which parameter is to be determined:

a) Immunohistochemical staining for C-erb-2 with diaminobenzidine (DAB) as substrate (chemical staining agent)—collectively "Cerb-DAB"—this is for assessing C-erb-2 gene amplification status;

b) Oestrogen receptor (ER) with DAB as substrate (collectively "ER-DAB") for assessing the expression (the amount expressed or emitted) of the oestrogen receptors. Progesterone receptor (PR) status is investigated using chemical treatment giving the same colouration as in ER.

c) Immunohistochemical staining for CD31 with fuchsin (F) as substrate for assessing vascularity (angiogenesis).

In a prior art manual procedure, a clinician places a slide under a microscope and examines a region of it (referred to as a tile) at magnification of ×40 for indications of C-erb-2, ER and PR status and at ×20 for vascularity.

The present invention requires data from histological slides in a suitable form. In the present example, image data were obtained by a pathologist using Zeiss Axioskop microscope with a Jenoptiks Progres 3012 digital camera. Image data from each slide is a set of digital images obtained at a linear magnification of 40 (i.e. 40×), each image being an electronic equivalent of a tile. At 40× magnification using this camera, each pixel in the image corresponds to a square with side 220 nm approximately in the unmagnified slide (218 nm vertically by 225 nm horizontally in practice). Pixels are therefore square to better than ±5%, which is what is assumed in the image processing techniques to be described later.

To select images, a pathologist scans the microscope over a slide, and at 40× magnification selects regions (tiles) of the slide which appear to be most promising in terms of an analysis to be performed. Each of these regions is then photographed using the microscope and digital camera referred to above, which produces for each region a respective digitised image in three colours, i.e. red, green and blue (R, G & B). Three intensity values are obtained for each pixel in a pixel array to provide an image as a combination of R, G and B image planes. This image data is stored temporarily at 12 for later use.

Three tiles are required for vascularity measurement at 14, and one tile for each of oestrogen and progesterone receptor measurement at 16 and C-erb-2 measurement at 18. These measurements provide input to a diagnostic report at 20.

The prior art manual procedure for scoring C-erb-2 involves a pathologist subjectively and separately estimating stain intensity, stain location and relative number of cells associated with a feature of interest in a tissue sample. The values obtained in this way are combined by a pathologist to give a single measurement for use in diagnosis, prognosis and reaching a decision on treatment. The process hereinafter described in this example replaces the prior art manual procedure with an objective procedure.

Figure 2:
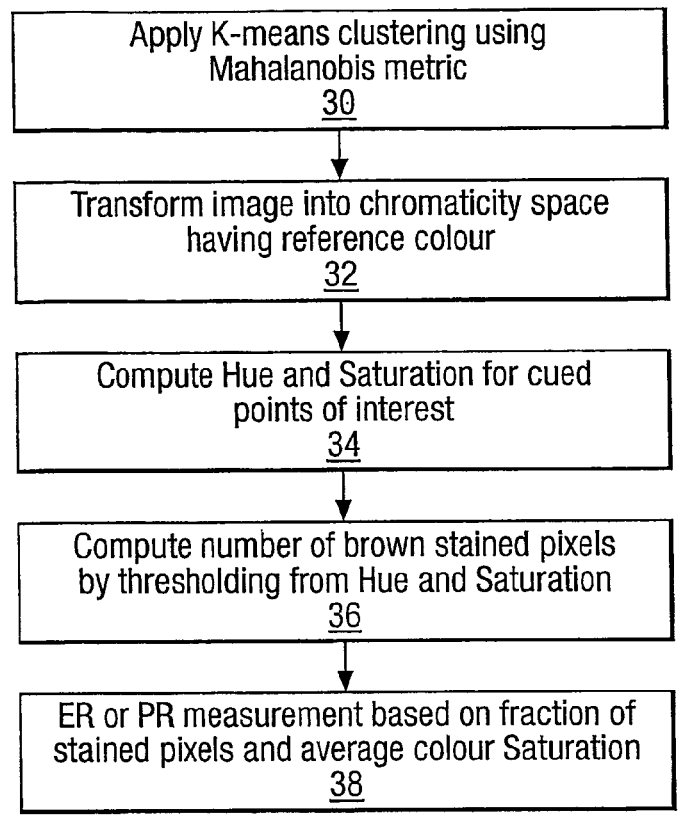
FIG. 2 is a block diagram of a process for measuring ER and PR receptor status in the procedure of FIG. 1.

Referring now to FIG. 2, processing 16 to determine ER status will be outlined and then described in more detail later. It begins with a pre-processing stage 30 in which a K-means clustering algorithm is applied to a colour image using a Mahalanobis metric. This determines or cues image regions of interest for further processing by associating pixels into clusters on the basis of their having similar values of the Mahalanobis metric. At 32 the colour image is transformed into a chromaticity space which includes a location of a reference colour. Hue and saturation are calculated at 34 for pixels in clusters cued by K-means clustering. The number of brown stained pixels is computed at 36 by thresholding on the basis of hue and saturation. An ER status measurement is then derived at 38 from a combination of the fraction of stained pixels and average colour saturation.

The input for the ER preprocessing stage 30 consists of raw digital data files of a single histopathological colour image or tile. A triplet of image band values for each pixel represents the colour of that pixel in its red, green, and blue spectral components or image bands. These values in each of the three image bands are in the range [0 . . . 255], where [0, 0, 0] corresponds to black and [255, 255, 255] corresponds to white.

The K-means clustering algorithm 30 is applied to the digital colour image using clusters and the Mahalanobis distance metric. A cluster is a natural grouping of data having similar values of the relevant metric, and the Mahalanobis distance metric is a measurement that gives an indication of degree of closeness of data items to a cluster centre. It is necessary to have some means for locating cell nuclei as pixel groups but it is not essential to use four clusters or the Mahalanobis distance metric: these have been found to work well in identifying groups of contiguous pixels which correspond to respective cell nuclei. The K-means algorithm is described by J. A. Hartigan and M. A. Wong, in a paper entitled 'A K-means clustering algorithm', Algorithm AS 136, Applied Statistics Journal, 1979. The Mahalanobis distance metric is described by F. Heijden, in 'Image Based Measurement Systems—object recognition and parameter estimation', John Wiley & Sons, 1994 and by R. Schalkoff, in 'Pattern Recognition—Statistical, Structural and Neural approaches', John Wiley & Sons Inc., 1992. The process comprises an initialisation step a) followed by computation of a covariance matrix at step b). This leads to a likelihood calculation at step c), which effectively provides the distance of a pixel from a cluster centre. The procedure is as follows:

a) Initially, cluster centres are set using 30+(cluster number+1)×10 subtracted from the mean of the red, green and blue image bands respectively. For example the first cluster values would be set at mean_red −30+(0+1)×10 (hence mean_red −20), similarly for mean_green and mean_blue. The second cluster would be mean_red −10, mean_green −10, and mean_blue −10, and similarly for other clusters. Pixels are then assigned to clusters for later readjustment.

b) For each cluster the following computations are carried out:

i) Compute elements of the kind $\sigma_{ij}^k$ of a covariance matrix of the image bands indicating the degree of variation between intensities of different colours in pixels of each cluster from Equation (1):

$$\sigma_{ij}^k = \frac{1}{N^k} \sum_{l=1}^{N^k} (c_{li} - \mu_i^k)(c_{lj} - \mu_j^k) \qquad (1)$$

where:

$\sigma_{ij}^k$ is the $ij^{th}$ element of the covariance matrix, $N^k$ is the number of pixels in cluster k, $c_{li}$ and $c_{lj}$ are the values of pixel l in image bands i and j, i, j take values 1, 2, 3, which represent the red, green and blue image bands respectively, $\mu_i^k$ is the mean of all pixels in image band i belonging to cluster k, and $\mu_j^k$ is the mean of all pixels in image band j belonging to cluster k.

ii) Calculate the determinant of the covariance matrix denoted as $$\sum_{det}^{k}.$$

iii) Calculate the inverse of the covariance matrix denoted as $$\sum_{inv}^{k}.$$

c). With index i denoting pixel number, each pixel $\vec{x}_i$ is now treated as a vector having three elements $x_{i,1}$, $x_{i,2}$, $x_{i,3}$ which are the red ($x_{i,1}$), green ($x_{i,2}$) and blue ($x_{i,3}$) pixel values: the red, green and blue image bands are therefore represented by second subscript indices 1, 2 and 3 respectively. With i ranging over all pixels in a cluster k, the likelihood $d^k(\vec{x}_i)$ of a pixel vector $\vec{x}_i$ not belonging to that cluster is computed from Equation (2) below:

$$d^k(\vec{x}_i) = \ln\left(\sqrt{\sum_{det}^{k}}\right) + 1/2\left[(\vec{x}_i - \vec{\mu}^k)^t \sum_{inv}^{k} (\vec{x}_i - \vec{\mu}^k)\right] \qquad (2)$$

where $$\sum_{det}^{k}$$

and $$\sum_{inv}^{k}$$

are as defined above, $\mu_i^k$ is the mean of all pixel vectors $\vec{x}_i$ in cluster k, and t indicates the transpose of the difference vector $(\vec{x}_i - \vec{\mu}^k)$.

Equation (2) is re-evaluated for the same pixel vector $\vec{x}_i$ in all other clusters also. Pixel vector $\vec{x}_i$ has the highest likelihood of belonging to a cluster (denoted $k_m$) for which $d^k(\vec{x}_i)$ has a minimum value i.e. $\{d^{k_m}(\vec{x}_i)\}$; cluster $k_m$ is then the most suitable to receive pixel $\vec{x}_i$; i.e. find:

$$d^{k_m}(\vec{x}_i) \leq d^k(\vec{x}_i) \text{ for all } k \neq k_m \qquad (3)$$

Assign pixel $\vec{x}_i$ to cluster $k_m$ d). For each cluster k:

Store a record of which pixels belong to cluster k as an array $X^k$, update it with each pixel vector assigned to that cluster and update the number $N^k$ of pixels in that cluster.

Calculate the cluster centre $\mu_j^k$ for each image band j=1, 2 and 3 from:

$$\mu_j^k = \frac{1}{N^k} \sum_{i=1}^{N^k} x_i^k \qquad (4)$$

Iterate steps b) to d) until convergence, i.e. when no more pixels change clusters or the number of iterations reaches a total of 20.

The first cluster (k=1) now corresponds to cell nuclei and the corresponding pixel vectors are those which are cued as of interest for output and further processing.

Transformation of the image at 32 from red/green/blue (RGB) to chromaticity space. In the present example, as will be described, a reference colour is used: if necessary, this can be avoided using e.g. the approach of the Cerb B2 example described later. The chemical staining used in the present example results in brown colouration and the approach used here is arranged to detect that preferentially; a different staining could however be used, in which case the technique would be adapted to detect a different pixel colour.

In practice brightness is liable to vary due to variation in degree of chemical staining and sample thickness across a slide, as well as possible vignetting by a camera lens used to produce the images. In consequence in this example emphasis is placed on computing a measurement of hue (or colour) and saturation as described later.

Figure 3:
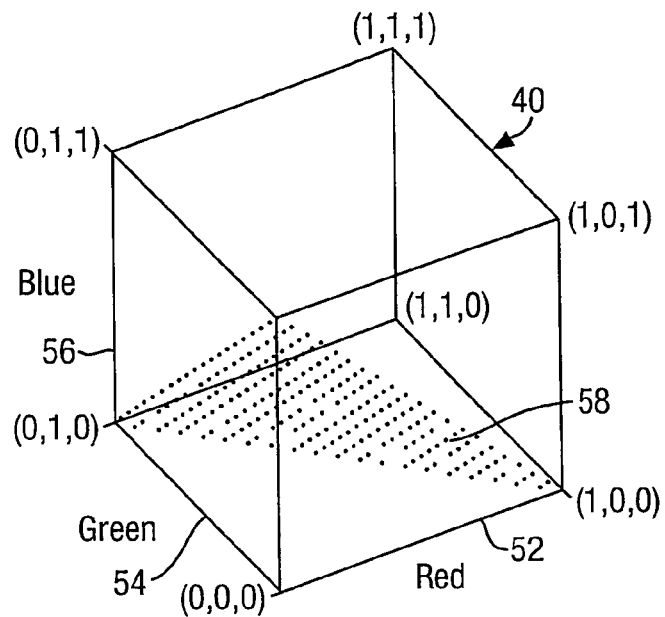
FIG. 3 is a pseudo three dimensional view of a red, green and blue colour space (colour cube) plotted on respective orthogonal axes.

(a) Referring now also to FIGS. 3 to 6, each RGB image is transformed into a chromaticity space. FIG. 3 shows an RGB cube 40 in which red, green and blue pixel values (expressed as R, G and B respectively) are normalised and represented as values in the range 0 to 1. These pixel values are represented on red, green and blue axes 52, 54 and 56 respectively. The chromaticity space is a plane 58 for which R+G+B=1: it is triangular within the RGB cube 50 and passes through the points (1,0,0), (0,1,0) and (0,0,1).

Figure 4:
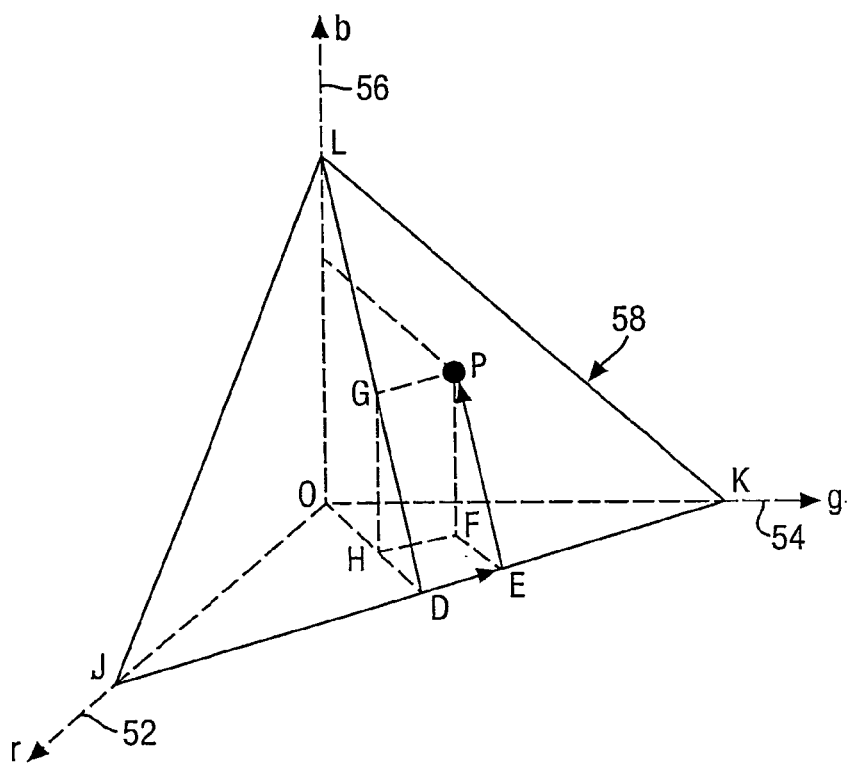
FIG. 4 is a transformation of FIG. 3 to form a chromaticity space.

(b) FIG. 4 shows the axes 52, 54 and 56 and chromaticity space 58 looking broadly speaking along a diagonal of the RGB cube 50 from the point (1,1,1) (not shown) to the origin (0,0,0) now referenced O for convenience. The points (0,0,1), (0,1,0) and (1,0,0) in FIG. 3 are now referenced J, K and L respectively. D is a midpoint of a straight line between J and L. Image pixel values from the input RGB image are projected on to the chromaticity space 108 and the resulting projections become data points for further processing. The projection calculation is as follows:

Red green and blue pixel chromaticity values r, g and b respectively are defined as:

$$r = \frac{R}{R+G+B}, g = \frac{G}{R+G+B}, \text{ and } b = \frac{B}{R+G+B} \quad (5)$$

Perpendiculars from a point P in the chromaticity space 108 to the lines JK and LD meet the latter at E and G respectively. Perpendiculars from P and G to the plane JOK meet the latter at F and H respectively. Using Equations (5), the point P in the triangular chromaticity space 58 may then be defined by x and y co-ordinates shown in FIG. 4 and given by:

$$x = DE = HF = \frac{g-r}{\sqrt{2}} \text{ and } y = PE = GD = b\sqrt{\frac{3}{2}} \quad (6)$$

Figure 5:
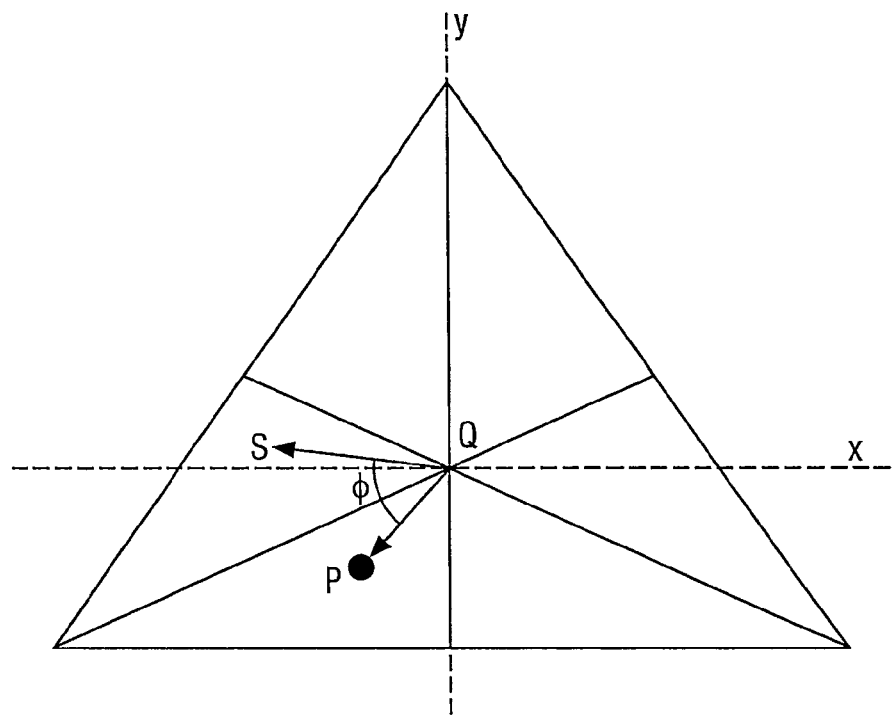
FIG. 5 is a drawing of a chromaticity space reference system.

(c) In FIG. 5, the chromaticity space 58 is shown with x and y co-ordinate axes extending from an origin Q. A reference colour denoted by a point S in the drawing is now defined as that specified for this purpose by a clinician: it is the colour of that part of the image which is most positively stained (the most intense colour on the part of the original slide from which the image was taken). The reference colour's RGB components are taken from the image and its x and y co-ordinates are computed using Equations (5) and (6): these co-ordinates are denoted as $(\tilde{x}, \tilde{y})$.

Figure 6:
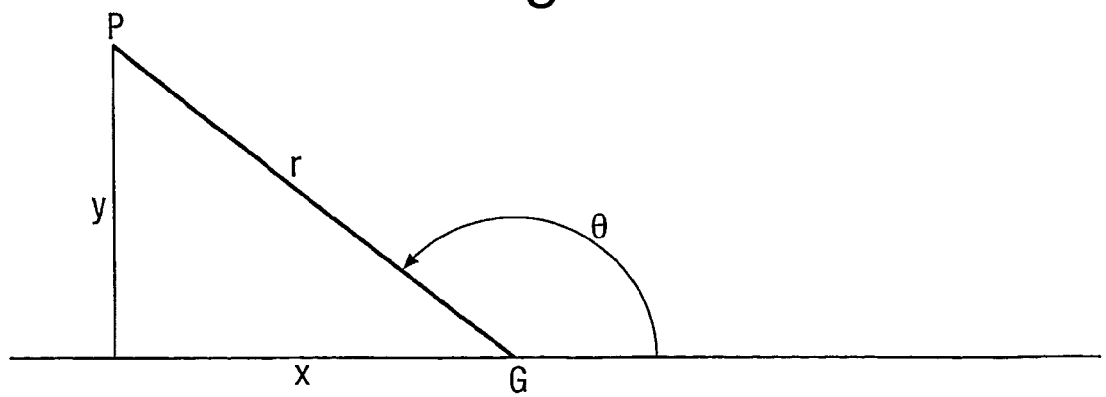
FIG. 6 illustrates use of polar co-ordinates.

(d) In FIG. 6, a polar co-ordinate system $(r, \theta)$ is now defined on the (R+G+B=1) plane or chromaticity space 58. The co-ordinate system origin is the centre of gravity G of the triangle 58. A reference direction for $\theta = 0$ is defined as the direction QS of the radius vector to the reference colour S in FIG. 5. For any point such as P on the triangle defined as having co-ordinates (x,y) in the HSV colour space, hue H is defined as the angle $\phi$ between the radius vector (e.g. QP) to itself and the radius vector QS to the reference colour. This is computed at 34 from the following expressions for $\phi$:

$$\sin\phi = \frac{\tilde{x}y - x\tilde{y}}{\sqrt{\tilde{x}^2 + \tilde{y}^2}\sqrt{x^2 + y^2}} \quad (7)$$

$$\cos\phi = \frac{x\tilde{x} - y\tilde{y}}{\sqrt{\tilde{x}^2 + \tilde{y}^2}\sqrt{x^2 + y^2}} \quad (8)$$

and the angle $\phi$ is defined to be $$\sin^{-1}\frac{|\tilde{x}y - x\tilde{y}|}{\sqrt{\tilde{x}^2 + \tilde{y}^2}\sqrt{x^2 + y^2}} \quad (9)$$

For convenience the definition of hue H is now altered somewhat to render all values positive and in the range 0 to $\pi/2$: the transformation of earlier values $\phi$ into a new version $\psi$ is shown in Table 1 below:

TABLE 1

| Condition | Magnitude of $\psi$ (New Hue H) |
|---|---|
| sin $\phi$ > 0 and cos $\phi$ > 0 | $\phi$ |
| sin $\phi$ > 0 and cos $\phi$ < 0 | $\pi - \phi$ |
| sin $\phi$ < 0 and cos $\phi$ > 0 | $-\phi$ |
| sin $\phi$ < 0 and cos $\phi$ < 0 | $\phi - \pi$ |

A hue (H) threshold $\psi_0$ is set at 36 by a user or programmer of the procedure as being not more than $\pi/2$, a typical value which might be chosen being 80 degrees. Saturation S is defined to be $$\text{saturation} = \frac{x\tilde{x} + y\tilde{y}}{\tilde{x}^2 + \tilde{y}^2} \quad (10)$$

Two values of saturation threshold $S_0$ are set according to whether or not image pixel saturation value S lies in the range 0.1 to 1.9: this is set out in Table 2 below:

TABLE 2

| Saturation S | $S_0$ |
|---|---|
| Either S < 0.1 or S > 1.9 | 0 |
| 0.1 ≤ S ≤ 1.9 | 0.9 |

At 36, the thresholds are used to count selectively the number $N_b$ of pixels which are sufficiently brown (having a large enough value of saturation) having regard to the reference colour. All H and S pixel values in the image are assessed. The conditions to be satisfied by a pixel's hue and saturation values for it to be counted in the brown pixel number $N_b$ are set out in Table 3 below.

TABLE 3

| Condition | Action |
|---|---|
| For each pixel with both hue modulus $|\psi| < \psi_0$ and saturation S > $S_0$ | Treat as a "saturated" pixel; increase count $N_b$ of brown pixels by 1 |
| For each pixel with $|\psi| \geq \psi_0$ and/or saturation S ≤ $S_0$ | Treat as an "unsaturated" pixel; leave $N_b$ unchanged |

The average saturation of the $N_b$ saturated pixels determined in Table 3 is computed by adding all their saturation values S together and dividing the resulting sum by $N_b$. The maximum saturation value of the saturated pixels is then determined, and the average saturation is normalised by expressing it as a percentage of this maximum: this approach is used to counteract errors due to variation in colour staining between different images.

The normalised average saturation is then accorded a score at 38 of 0, 1, 2 or 3 according respectively to whether this percentage is (a) ≦25%, (b) >25% and ≦50%, (c) >50% and ≦75% or (d) >75% and ≦100%.

The fraction of saturated pixels—those corresponding to cells stained sufficiently brown relative to surrounding tissue—is computed at 38 from the ratio $N_b/N$ where N is the total number of pixels in the image. This fraction is then quantised to a score in the range 0 to 5 as set out in Table 5 below.

TABLE 5

| $N_b/N$: Fraction of image pixels that are stained | Score |
| --- | --- |
| 0.00 | 0 |
| <0.01 | 1 |
| 0.01–0.10 | 2 |
| 0.11–0.33 | 3 |
| 0.34–0.66 | 4 |
| 0.67–1.00 | 5 |

The two scores determined above, i.e. for normalised average saturation and fraction of sufficiently brown pixels are now added together to give a measure in the range 0 to 8. The higher this number is, the more oestrogen (ER) positive the sample is, as shown in Table 6 below.

TABLE 6

| Description of ER status (ER Score) | Range |
| --- | --- |
| Strongly positive | 7–8 |
| Positive | 4–6 |
| Weakly positive | 2–3 |
| Negative | 0–1 |

Women with an ER score of 7 or 8 will respond favourably to hormonal treatment such as Tamoxifen; women with an ER score in the range 4 to 6 will have 50% of chance of responding to this treatment. Women scoring 2 or 3 will not respond very well, and those scoring 0 or 1 will not respond to hormonal treatment at all.

Images for ER and PR are indistinguishable visually and they are distinguished by the fact that they are produced using different stains. A PR score is therefore produced from stained slides in the same way as an ER score described above. The significance of progesterone receptor (PR) positivity in a breast carcinoma is less well understood than the equivalent for ER. In general, cancers that are ER positive will also be PR positive, However, carcinomas that are PR positive, but not ER positive, may have a worse prognosis.

Turning now to C-erb-2 the conventional manual technique involves processing a histopathological slide with chemicals to stain it appropriately, after which it is viewed by a clinician. Breast cells on the slide will have stained nuclei with a range of areas which allows discrimination between tissue cells of interest and unwanted cell types which are not important to cancer assessment. Cancerous cells will usually have a larger range of sizes of nuclei which must be allowed for in the discrimination process. A clinician needs to ignore unwanted cell types and to make a measurement by subjectively grading cells of interest as follows:

| Score | Staining Pattern |
| --- | --- |
| 0 | membrane staining in less than 10% of cells |
| 1 | just perceptible membrane staining in more than 10% of cells but membranes incompletely stained |
| 2 | weak to moderate complete membrane staining of more than 10% of cells |
| 3 | strong complete membrane staining of more than 10% cells |

Scores 0 and 1 are negative (not justifying treatment), whereas scores 2 and 3 are called positive (justifying treatment).

Unfortunately, there are artefacts which make measurement more complicated, as follows:
Retraction (shrinking) artefact: less sharply defined than true membrane staining;
Thermal artefact: if a electrocautery instrument is used, rather ill-defined staining occurs;
Crushing artefact: the tissue is inadvertently mechanically deformed allowing more ill-defined staining.

Thermal and crushing artefacts are normally confined to boundaries of a tissue specimen and would hopefully be excluded to some extent by a clinician photographing tiles from a slide. However, it is still important to guard against ill-defined staining not attached to a cell membrane.

The technique of this invention attempts to measure the parameters mentioned above namely:
Completeness of cell membrane staining;
Intensity and thinness of cell membrane staining; and
Ratio of cell membrane staining.

There are two main stages in the present invention, and these may optionally be preceded by pre-processing if images are poor. The main stages are:
finding cell nuclei which satisfy area and location limitations associated with tumours; and
determining a score which characterises the membranes of the cell nuclei found in the preceding stage.

Referring now to FIG. 7, the C-erb-2 technique of the invention will firstly be outlined and later described in more detail. An optional preprocessing step 70 is carried out if images of tiles are poor due to camera vignetting or colour errors across the image.

Image segmentation is carried out in steps 71 to 78, i.e. automated separation of objects from a background in a digital image. The original digital image of a tile has red, green and blue image planes: from the green and blue image planes a cyan image plane is derived at 71 and a Sobel-filtered cyan image plane at 72. There are now five image planes: of these only the red and blue image planes are essential with conventional colour staining, the other image planes are used for desirable but not essential filtering operations upon the red image planes. Statistical measures of the five image planes are computed at 74 and 76, and then a segmented image is optimised and generated at 78 which has been filtered to remove unwanted pixels and spatial noise. The segmented image identifies cell nuclei. Step 78 is an adaptive thresholding technique using information from regions around pixels: it is shown in more detail within chain lines 80 with arrows 82 indicating iterations. It is an alternative to the K-means clustering algorithm previously described, which could also be used.

If at 84 the number of cells found is less than 16, the image is rejected at 86: if it is 16 or greater, then having found the cell nuclei, and hence the cells, the strength, thinness and completeness of each cell's surrounding membrane staining are measured and the membrane stainings are then ranked.

For each cell, at 88 a sequence of cross-correlation windows of varying widths is passed along four radii from the cell centroid to determine the cell boundary brightness value, membrane width and distance from the centroid of the most intense staining. Cell boundary brightness value is normalised by dividing by membrane width. Nuclear area and sum of normalised boundary brightness values for each cell are then obtained. Statistical measures characterising membrane-staining strength, specificity and completeness are then deduced: these measures are compared with equivalents obtained from four reference images. The measured image is then graded by assigning it a score which is that of the closest reference, with the metric of Euclidean-distance. Other metrics may also be used. Alternatively, the scores of a moderately large sample may be used as references.

The C-erb-2 process will now be described in more detail. The process 18 is applied to one image or tile obtained by magnifying by a factor of 40 an area of a histological slide. Referring to FIG. 7 once more, The optional preprocessing step 70 is carried out by either:

(a) dividing the image into a suitable number of tiles (with less individual variability) and processing them separately—this should be considered an option in general, though it is not necessary if there is reasonable uniformity across individual images; or (b) preferably, if sufficient images are available from the same camera objective lens, computing its deficiency and correcting it, rather than processing sub-images with more part-cells split across boundaries.

The digital image of a slide is a three colour or red green and blue (RGB) image as defined above, i.e. there is a respective image plane for each colour. For the purposes of the following analysis, the letters R, G and B for each pixel are treated as the red green and blue intensities at that pixel. The RGB image is used at 71 to compute a cyan image derived from the blue and green image planes: i.e. for each pixel a cyan intensity C is computed from C=(2×B+G)/3, the respective pixel's green (G) intensity being added to twice its blue (B) intensity and the resulting sum being divided by three. When repeated for all pixels this yields a cyan image or image plane. Cyan is used because it is a complementary colour to brown, which is the cell boundary colour produced by conventional chemical staining of a specimen. The blue image plane could be used instead but does not normally produce results as good as the cyan image. If a different colour staining were to be use, the associated complementary colour image would be selected. This process step is not essential but it greatly assists filtering out unwanted pixels and it does so without a reference colour (see the ER/PR example which uses an alternative approach).

At 72, a Sobel edge filter is applied to the cyan image plane: this is a standard image processing technique published in Klette R., & Zamperoni P., 'Handbook of image processing operators', John Wiley & Sons, 1995. A Sobel edge filter consists of two 3×3 arrays of numbers $S_P$ and $S_Q$, each of which is convolved with successive 3×3 arrays of pixels in an image. Here $$S_P = \begin{bmatrix} 1 & 2 & 1 \\ 0 & 0 & 0 \\ -1 & -2 & -1 \end{bmatrix} \text{ and } S_Q = \begin{bmatrix} 1 & 0 & -1 \\ 2 & 0 & -2 \\ 1 & 0 & -1 \end{bmatrix} \tag{11}$$

The step 72 initially selects a first cyan 3×3 array of pixels in the top left hand corner of the cyan image: designating as $C_{ij}$ a general cyan pixel in row i and column j, the top left hand corner of the image consists of pixels $C_{11}$ to $C_{13}$, $C_{21}$ to $C_{23}$ and $C_{31}$ to $C_{33}$. $C_{ij}$ is then multiplied by the respective digit of $S_P$ located in the $S_P$ array as $C_{ij}$ is in the 3×3 cyan pixel array: i.e. $C_{11}$ to $C_{13}$ are multiplied by 1, 2 and 1 respectively, $C_{21}$ to $C_{23}$ by zeroes and $C_{31}$ to $C_{33}$ by −1, −2 and −1 respectively. The products so formed are added algebraically and provide a value p.

The value of p will be relatively low for pixel values changing slowly between the first and third rows either side of the row of $C_{22}$, and relatively high for pixel values changing rapidly between those rows: in consequence p provides an indication of image edge sharpness across rows. This procedure is repeated using the same pixel array but with $S_Q$ replacing $S_P$, and a value q is obtained: q is relatively low for pixel values changing slowly between the first and third columns either side of the column of $C_{22}$, and relatively high for pixel values changing rapidly between those columns: and q therefore provides an indication of image edge sharpness across columns. The square root of the sum of the squares of p and q are then computed i.e. $\sqrt{p^2+q^2}$, which is defined as an "edge magnitude" and becomes $T_{22}$ (replacing pixel $C_{22}$ at the centre of the 3×3 array) in the transformed cyan image. It is also possible to derive an edge "phase angle" as $\tan^{-1} p/q$, but that is not required in the present example.

A general pixel $T^{ij}$ (row i, column j) in the transformed image is derived from $C_{i-1,j-1}$ to $C_{i-1,j+1}$, $C_{i,j-1}$ to $C_{i,j+1}$ and $C_{i+1,j-1}$ to $C_{i+1,j+1}$ of the cyan image. Because the central row and column of the Sobel filters in Equation (11) respectively are zeros, and other coefficients are 1s and 2s, p and q for $T_{ij}$ can be calculated as follows:

$$p=\{C_{i-1,j-1}+2C_{i-1,j}+C_{i-1,j+1}\}-\{C_{i+1,j-1}+2C_{i+1,j}+C_{i+1,j+1}\} \tag{12}$$

$$q=\{C_{i-1,j-1}+2C_{i,j-1}+C_{i+1,j-1}\}-\{C_{i-1,j+1}+2C_{i,j+1}+C_{i+1,j+1}\} \tag{13}$$

Beginning with i=j=2, p and q are calculated for successive 3×3 pixel arrays by incrementing j by 1 and evaluating Equations (2) and (3) for each such array until the end of a row is reached; j is then incremented by 1 and the procedure is repeated for a second row and so on until the whole image has been transformed. This transformed image is referred to below as the "Sobel of Cyan" image or image plane.

The Sobel filter cannot calculate values for pixels at image edges having no adjacent pixels on one or other of its sides: i.e. in a pixel array having N rows and M columns, edge pixels are the top and bottom rows and the first and last columns, or in the transformed image pixels $T_{11}$ to $T_{1M}$, $T_{N1}$ to $T_{NM}$, $T_{11}$ to $T_{1M}$ and $T_{1M}$ to $T_{NM}$. By convention in Sobel filtering these edge pixels are set to zero.

A major problem with measurements on histopathological images is that the staining of different slides can vary enormously, e.g. from blue with dark spots to off-white with brown outlines. The situation can be improved by sifting the slides and using only those that conform to a predetermined colouration. However, it has been found that it is possible to cope with variation in staining to a reasonable extent by using statistical techniques to normalise images: in this connection steps 74 and 76 derive a variety of statistical parameters for use in image segmentation in step 78.

In Step 74 is computed the mean and standard deviation of the transformed pixel values $T_{ij}$. For convenience a change of nomenclature is implemented: index k is substituted for i and j, i.e. k=1 to NM for i, j=1, 1 to N, M: this treats a two dimensional image as a single composite line composed of successive rows of the image. Also x is substituted for T in each pixel value, so $T_{ij}$ becomes $X_k$. The following Equations (14) and (15) respectively are used for computing the mean $\mu$ and standard deviation $\sigma$ of the transformed pixels $x_k$.

$$\mu = \frac{1}{NM} \sum_{k=1}^{NM} x_k \quad (14)$$

$$\sigma = \sqrt{\frac{1}{NM-1} \sum_{k=1}^{NM} (x_k - \mu)^2} \quad (15)$$

At 76, various statistical parameters are computed for the Red, Green, Blue and Cyan image planes using Equations (14) and (15) above.

For the Red image plane the statistical parameters are the mean $\mu_R$ and standard deviation $\sigma_R$ of its pixel values: in Equations (14) and (15), $x_k$ represents a general pixel value in the Red image plane. In addition, the Red image plane's pixels are compared with one another to obtain their maximum, minimum and range (maximum−minimum). Similarly, pixels in each of the Green and Blue image planes are compared with one another to obtain a respective maximum, minimum and range for each plane. Finally, for the Cyan image, pixels' mean and standard deviation are computed using Equations (14) and (15), in which $x_k$ represents a general pixel value in the Cyan image plane.

In step 78, the image is segmented to identify and locate cell nuclei. A pixel is counted as part of a cell nucleus if and only if it survives a combination of thresholding operations on the Red, Green, Blue, Cyan and Sobel of Cyan image planes followed by closure of image gaps left after thresholding operations. It is necessary to determine threshold values in a way which allows for variation in chemical staining between different images. The technique employed in this example is to perform a multidimensional optimisation of some thresholds with nuclei-number as the objective-function to be maximised: i.e. for a given image, threshold values are altered intelligently until a near maximum number of nuclei is obtained. Starting values are computed for the optimisation routines by choosing those suitable for provision of threshold levels. In this example, two dimensional optimisation is used requiring three starting values indicated by sufffixes 1, 2 and 3 and each with two components: the starting values represent vertices of a triangle in a two dimensional plane. The starting values are (RMM1, CMM1), (RMM2, CMM2) and (RMM3, CMM3), RMM indicating a "Red Mean Multiplier" and CMM indicating a "Cyan Mean Multiplier". Tests using a substantial number of images have shown that suitable starting values are RMM1=0.802, CMM1=1.24, RMM2=CMM2=0.903, RMM3=1.24 and CMM3=0.802.

For images counterstained with Haemotoxylin and Eosin (H&E) cell nuclei are strongly stained blue—i.e. they have very low values in the complementary red plane. Hence the red plane is the primary plane used in thresholding as follows:

(a) Produce a thresholded image for the Red image plane (approximately complimentary to Blue) as follows: for every Red pixel value that is less than an adaptive threshold, set the corresponding pixel location in the thresholded Red image to 1, otherwise set the latter to 0. A respective adaptive threshold is computed separately for every pixel location as follows. At a) in step 78, the Red image threshold value is dependent on the presence of enclosing brown stain in the neighbourhood of each pixel, i.e. it is a function of Cyan mean $\mu_C$ and Red mean $\mu_R$. A check for enclosing brown is performed by searching radially outwards from a pixel under consideration. The procedure is in the Cyan image plane to select the same pixel location as in the Red image plane and from it to search in four directions—north, south, east and west directions—for a distance of seventy pixels (or as many as are available up to seventy). Here north, south, east and west have the following meanings: north: upward from the pixel in the same column; south: downward from the pixel in the same column; east: rightward from the pixel in the same row; and west: leftward from the pixel in the same row. More directions (e.g. diagonals north-east, north-west, south-east and south-west) could be used to improve accuracy but four have been found to be adequate for the present example. In any of these directions or radii either a cyan pixel will fall below a threshold (indicating a brown pixel) or a radius of 70 pixels will be reached without a cyan pixel doing so. Here the 70 pixels value or number of pixels $N_{p1}$ for the radius corresponds to 40× magnification and a pixel side length corresponding to a distance of 220 nm on an unmagnified slide, as described earlier. For another magnification giving another pixel side length $L_{p2}$ in nm, the new number of pixels value $N_{p2}$ or radius should be $N_{p1}(220/L_{p2})$ pixels. The number $R_B$ of "brown" radii (radii intersecting at least one brown pixel) is then used to change the red threshold adaptively in the following way: There is calculated a new Red image plane threshold RTN=RMM1$\mu_R - \sigma_R(4-R_B)$, where RMM1$\mu_R$ is the product of RMM1 and $\mu_R$ and $\sigma_R$ is the standard deviation of the Red image plane. A limit is placed on RTN giving it a maximum possible value of 255. If the Red image plane pixel under consideration is less than the Red image plane threshold calculated for it, the corresponding pixel at the same location in the thresholded Red image is set to one, otherwise it is set to zero.

(b) Using the Cyan image plane, and with the Cyan mean $\mu_C$ from step 74, for every Cyan pixel value that is less than the product of CMM1 and $\mu_C$, set the pixel in the corresponding location in the thresholded Red image to 0, otherwise do not change the pixel. This has the effect of removing excess brown pixels.

(c) Using the Sobel of Cyan image plane, and with the Cyan mean $\mu_C$ and standard deviation $\sigma_C$ from step 74: i.e. for every Cyan pixel value that is greater than $(\mu_C + 1.5\sigma_C)$ set the corresponding pixel in the thresholded Red image to 0, otherwise do not change the pixel. This has the effect of removing brown edge pixels.

(d) Pixels corresponding to lipids are now removed as follows: using the pixel minimum and range values computed at step 76, a thresholded Red image is produced using data obtained from the Red, Green and Blue image planes: for each Red, Green and Blue pixel group at a respective pixel location that satisfies all three criteria at (i) to (iii) below, set the pixel at the corresponding location in the thresholded Red image to 0, otherwise do not change the pixel; this has the effect of removing lipid image regions (regions of fat which appear as highly saturated white areas). Removal of these regions is not essential but is desirable to improve processing. The criteria for each set of Red, Green and Blue values at a respective pixel are:

Red value>Red minimum+0.98×(red range), AND (i)

Green pixel>Green minimum+0.98×(green range), AND (ii)

Blue pixel>Blue minimum+0.98×(blue range) (iii)

Steps (c) and (d) could be moved outside the recursion loop defined within chain lines 80 if desired, with consequent changes to the procedure.

(e) The next step is to apply to the binary image obtained at step (d) of 78 above a morphological closing operation, which consist of a dilation operation followed by an erosion operation. These morphological operations fuse narrow gaps and eliminate small holes in individual groups of contiguous pixels appearing as blobs in an image. They are not essential but they improve processing. They can be thought of as removal of irregularities or spatial "noise", and they are standard image processing procedures published in Umbaugh S. C., 'Colour vision and image processing', Prentice Hall, 1998.

(f) A connected component labelling process is now applied to the binary image produced at step (e). This is a known image processing technique (sometimes referred to as 'blob colouring') published by R Klette and P Zamperoniu, 'Handbook of Image Processing Operators', John Wiley & Sons, 1996, and A Rosenfeld and A C Kak, 'Digital Picture Processing', Vols. 1 & 2, Academic Press, New York, 1982. It gives numerical labels to "blobs" in the binary image, blobs being regions or groups of like-valued contiguous or connected pixels in an image: i.e. each group or blob consists of connected pixels which are all 1s, and each is assigned a number different to those of other groups. This enables individual blobs to be distinguished from others by means of their labels. The number of labelled image regions or blobs in the image is computed from the labels and output. Connected component labelling also determines each labelled image region's centroid (pixel location of region centre), height, width and area. Image regions are now removed from the binary image if they are not of interest because they are too small or too large in area or they have sufficiently dissimilar height and width indicating they are flattened. The remaining regions in the binary image pass to the next stage of processing at (g).

Steps (a) to (f) are carried out for all three starting points or triangle vertices (RMM1, CMM1), (RMM2, CMM2) and (RMM3, CMM3): this yields three values for the number of regions remaining in the binary image in each case.

(g) This step is referred to as the Downhill Simplex method: it is a standard iterative statistical technique for multidimensional optimisation published in Nelder J. A., Mead R., 1965, Computer Journal, vol. 7, pp 308–313, 1965. It takes as input the three numbers of regions remaining after step (f). It is possible to use other optimisation techniques such as that referred to as Powell which uses gradients. The starting point/vertex yielding the lowest number of regions remaining is then selected. A new starting point is then generated as the reflection of the selected vertex in the line joining to the two other vertices: i.e. if the three vertices were to have been at 1,1, 1,2 and 2,1, and 1,1 was the selected vertex, then the new starting point is 2,2. The selected vertex is then discarded and the other two retained. The new starting point or vertex becomes (RMM4, CMM4) and steps (a) to (f) are repeated using it to generate a new number of regions remaining for comparison with those associated with the two retained vertices. Again a vertex yielding the lowest number of regions remaining is selected, and the process of new (RMM, CMM) values and steps (a) to (f) is iterated as indicated by arrows 82. Iterations continue until the rate of change of remaining number of image regions (cell nuclei number) slows down, i.e. when successive iterations show a change of less than 10% in this number: at that point optimisation is terminated and the binary image remaining after step (f) selected for further processing is that generated using the (RMM, CMM) values giving the highest nuclei number.

The procedure 18 is now concerned with determining quantities referred to as "grand_mean" and "mean_range" to be defined later. If the Downhill Simplex method (g) has determined that there are less than a user specified number of image regions or cell nuclei, sixteen in the present example, then at 84 processing is switched to 86 indicating a problem image which is to be rejected.

If the Downhill Simplex method has determined that there are at least sixteen image regions, then at 84 processing is switched to 88 where a search to characterise these regions' boundaries is carried out. The search uses each region's area and centroid pixel location as obtained in connected component labelling at 78(f), and each region is assumed to be a cell with a centroid which is the centre of the cell's nucleus. This assumption is justified for most cells, but there may be misshapen cells for which it does not hold: it is possible to discard misshapen cells by eliminating those with concave boundary regions for example, but this is not implemented in the present example.

The search to characterise the regions' boundaries is carried out along the respective north, south, east and west directions (as defined earlier) from the centroid (more directions may be used to improve accuracy): it is carried out in each of these directions for a distance $\delta$ which is either 140 pixels or $2\sqrt{regionarea}$, area, whichever is the lesser. Here the 140 pixels figure for the radius corresponds to 40× magnification: for pixels sizes not corresponding to 220 nm in an original slide this pixels figure should be scaled using the formula $N_{p1}(220/L_{p2})$ as described earlier. The search employs the original (2B+G)/3 cyan image because experience shows that this image gives the best defined cell boundaries with the slide staining previously described. Designating $C_{ij}$ as the intensity of a region's centroid pixel in the cyan image at row i and column j, then pixels to be searched north, south, east and west of this centroid will have intensities in the cyan image of $C_{i+1,j}$ to $C_{i+\delta,j}$, $C_{i-1,j}$ to $C_{i-\delta,j}$, $C_{i,j+1}$ to $C_{i,j+\delta}$ and $C_{i,j-1}$ to $C_{i,j-\delta}$, respectively. The cyan intensity of each of the pixels to be searched is subtracted from the centroid pixel's cyan intensity $C_{ij}$ to produce a difference value, which may be positive or negative. In a cyan image, a cell nucleus is normally blue whereas a boundary is brown (with staining as described earlier).

Each pixel is then treated as being part of four linear groups or "windows" of six, twelve, twenty-four and forty-eight pixels each including the pixel and extending from it in a continuous line north, south, east or west (as defined earlier) according respectively to whether the pixel is north, south, east or west of the centroid (as before, these window lengths should be scaled by M/40 for magnifications M≠40). In effect pixels in each of the chosen directions have mathematical window functions applied to them, the function having the value 1 at pixels within a group and the value 0 outside it. In the linear groups in the present example, $C_{i+1,j}$ is for example grouped with $C_{i+2,j}$ to $C_{i+6,j}$, $C_{i+2,j}$ to $C_{i+12,j}$, $C_{i+2,j}$ to $C_{i+24,j}$, and $C_{i+2,j}$ to $C_{i+48,j}$ (inclusive in each case). This provides a total of 16δ groups from 4δ groups in each of four directions. For each group the difference between each of its pixels' cyan intensities and that of the centroid is calculated: the differences are summed over the group algebraically (positive and negative differences cancelling one another). This sum is divided by the number of pixels in the group to provide a net difference per pixel between the cyan intensities of the group's pixels and that of the centroid.

For each direction, i.e. north, south, east and west, there is now a respective set of 4δ net differences per pixel: in each set the net differences per pixel are compared and their maximum value is identified. This produces a respective maximum net difference per pixel for each of the sets, i.e. for each of the north, south, east and west directions, and size of window (number of pixels in group) in which the respective maximum occurred. The four maxima so obtained (one for each direction) and the respective window size in each case are stored. Each maximum is a measure of the region boundary (cell membrane) magnitude in the relevant direction, because in a cyan image the maximum difference as compared to a blue cell nucleus occurs at a brown cell boundary. The window size associated with each maximum indicates the region boundary width, because a boundary width will give a higher maximum in this technique with a window size which it more nearly matches as compared to one it matches less well. Greater accuracy is obtainable by using more window sizes and windows matched to cell boundary shape, i.e. multiplying pixels in each linear group by respective values collectively forming a boundary shape function. The process is in fact mathematically a correlation operation in which a window shape is correlated with a linear group of pixels. A further option is to record the position of the maximum or boundary (cell radius) as being that of one of the two pixels at the centre of the window in which the maximum occurs: this was not done in the present example, although it would enable misshapen cells to be detected and discarded as being indicated by significant differences in the positions of maxima in the four directions, and it would improve width measure by accounting for oblique intersections of windows and cell boundaries.

Each maximum or region boundary magnitude is then divided by the associated window size (region boundary width) used to derive it: this forms what is called for the purposes of this specification a normalised boundary magnitude—it is a measure of both brightness and sharpness: It enables discrimination against ill-defined staining not attached to a cell membrane.

The next step 90 is to apply what is referred to as a "quicksort" to the four normalised boundary magnitudes to sort them into descending order of magnitude. Quicksort is a known technique published by Klette R., Zamperoniu P., 'Handbook of Image Processing Operators', John Wiley & Sons, 1996, and will not be described. It is not essential but convenient. For each image region, measurements made as described above are now recorded in a respective 1-dimensional vector as set out in Table 7 below: in this table the directions North, East etc are lost in the quicksort ordering into largest, second largest, third largest and smallest.

TABLE 7

| Item number | Parameter |
| --- | --- |
| 1 | Largest normalised boundary magnitude |
| 2 | Second Largest normalised boundary magnitude |
| 3 | Third Largest normalised boundary magnitude |
| 4 | Smallest normalised boundary magnitude |
| 5 | Sum of Largest, Second Largest, Third Largest and Smallest normalised boundary magnitudes |

A further quicksort is now applied (also at 90) to the image regions to sort them into descending order of item 5 values in Table 7 above, i.e. sum of Largest, Second Largest, Third Largest and Smallest normalised boundary magnitudes. A subset of the image regions is now selected as being those having large values of item 5: these are the most significant image regions and they are the best one eighth of the total number of image regions in terms of item 5 magnitude. From this subset of image regions the following parameters are computed at 92, "grand_mean", "mean_range" and "relative_range" as defined below:

$$\text{octile} = \text{one eighth of the total number of image regions or cell nuclei} \quad (16)$$

$$\text{boundaries} = \text{normalised boundary magnitudes} \quad (17)$$

$$\Sigma = \text{sum of ... (over all boundaries in the subset or best octile)} \quad (18)$$

$$\text{item 1} = \text{Largest normalised boundary magnitude} \quad (19)$$

$$\text{item 3} = \text{Third Largest normalised boundary magnitude} \quad (20)$$

$$\text{grand\_mean} = 6 \times [(\Sigma \text{ Largest boundaries}) + (\Sigma \text{ Second Largest boundaries}) + (\Sigma \text{ Third Largest boundaries}) + (\Sigma \text{ Smallest boundaries})]/4\text{octile} \quad (21)$$

$$\text{mean\_range} = [(\Sigma \text{item 1}) - (\Sigma \text{ item 3})]/\text{octile} \quad (22)$$

$$\text{relative\_range} = 10 \times \text{mean\_range}/\text{grand\_mean} \quad (23)$$

Grand_mean is indicative of the degree to which an image exhibits good cell boundary sharpness and brightness. Relative_range indicates the degree to which an image exhibits brightness extending around cell boundaries—the smallest boundaries (item 4) are omitted from this computation to provide some robustness against incomplete cells. A cell boundary that exhibits a large value of relative_range will have brightness varying appreciably around the boundary corresponding to non-uniformity of staining or possibly even absence of a boundary.

At 94 an overall distance measure is computed: this measure provides an estimate of how far the current cyan image (generated at 71) is from each member of a predetermined standard set of images, four images in the present example. In this example the distance measure is computed against a set of four predetermined standard images: the standard images were obtained by dividing a large test dataset of images into four different image types corresponding respectively to four different C-erb-2 status indicators (as will be described later in more detail). The images of each image type were analysed to determine grand mean and relative range for each image using the process 18. A respective average grand mean $M_i$ (i=0, 1, 2 and 3) and a respective average relative range $RR_i$ were determined for the images of each of the four image types. As an alternative, it is also possible to select four good quality images of the relevant types by inspection from many images, and to determine $M_i$ and $RR_j$ from them.

The values $M_i$ and $RR_j$ become the components of respective four-element vectors M and RR, and are used in the following expression:

$$\text{C-erb-2 indicator} = \min_i\{(M_i - \text{grand mean})^2 + (RR_i - \text{relative range})^2\} \quad (24)$$

where $\min_i$ is the value of i (i=0, 1, 2 or 3) for which the expression within curved brackets { } on the right of Equation (24) is a minimum. For the vector M, from the dataset the following elements were determined: $M_0=12.32$, $M_1=23.16$, $M_2=42.34$ and $M_3=87.35$; elements determined likewise for the vector RR were $RR_0=2.501$, $RR_1=1.85$, $RR_2=1.111$ and $RR_3=0.5394$. The value of the index i is returned as the indicator for the C-erb-2 measurement process.

If a value of i=3 is obtained in the C-erb-2 measurement process, this is regarded as a strongly positive result: the patient from whom the original tissue samples were taken is regarded as highly suitable for treatment, currently with herceptin. A value of i=2 is weakly positive indicating doubtful suitability for treatment, and i=1 or 0 is a negative result indicating unsuitability. This is tabulated below in Table 8.

TABLE 8

| C-erb-2 status | i Value |
| --- | --- |
| Strongly positive | 3 |
| Weakly positive | 2 |
| Negative | 0, 1 |

Figure 8:
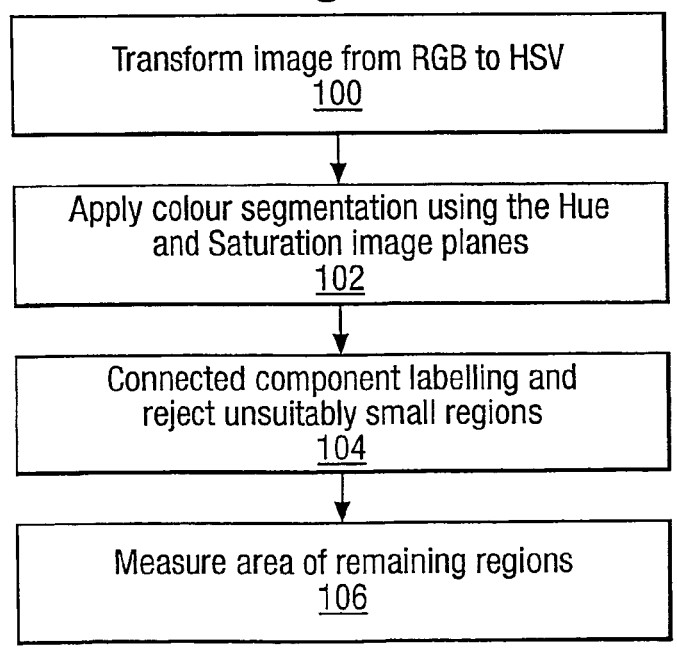
FIG. 8 is a block diagram of a process for measuring vascularity in the procedure of FIG. 1.

Referring now to FIG. 8, there is shown a flow diagram of the process 14 (see FIG. 1) for measurement of vascularity. The process 14 is applied to three images each of ×20 magnification compared to the histopathological slide from which they were taken. At 100 each image is transformed from red/green/blue (RGB) to a different image space hue/saturation/value (HSV). The RGB to HSV transformation is described by K. Jack in 'Video Demystified', $2^{nd}$ ed., High Text Publications, San Diego, 1996. In practice value V (or brightness) is liable to vary due to staining and thickness variations across a slide, as well as possible vignetting by a camera lens used to produce the images. In consequence in this example the V component is ignored: it is not calculated, and emphasis is placed on the hue (or colour) and saturation values H and S. H and S are calculated for each pixel of the two RGB images as follows:

$$\text{Let } M = \text{maximum of } (R,G,B) \quad (25)$$

$$\text{Let } m = \text{minimum of } (R,G,B) \quad (26)$$

$$\text{Then } \text{new}r = (M-R)/(M-m) \quad (27)$$

$$\text{new}g = (M-G)/(M-m) \text{ and} \quad (28)$$

$$\text{new}b = (M-B)/(M-m) \quad (29)$$

This converts each colour of a pixel into the difference between its magnitude and that of the maximum of the three colour magnitudes of that pixel, this difference being divided by the difference between the maximum and minimum of (R,G,B).

Saturation (S) is set as follows:

$$\text{if M equals zero, then } S=0 \quad (30)$$

$$\text{if M does not equal zero, then } S=(M-m)/M \quad (31)$$

The calculation for Hue (H) is as follows: from Equation (25) M must be equal to at least one of R, G and B:

$$\text{if M equals zero, then } H=180 \quad (32)$$

$$\text{If M equals R then } H=60(\text{new}b-\text{new}g) \quad (33)$$

$$\text{If } M \text{ equals } G \text{ then } H=60(2+\text{new}r-\text{new}b) \quad (34)$$

$$\text{If } M \text{ equals } B \text{ then } H=60(4+\text{new}g-\text{new}r) \quad (35)$$

$$\text{If } H \text{ is greater than or equal } 360 \text{ then } H=H-360 \quad (36)$$

$$\text{If } H \text{ is less than 0 then } H=H+360 \quad (37)$$

The Value V is not used in this example, but were it to be used it would be set to the maximum of (R,G,B).

The next step 102 is to apply colour segmentation to obtain a binary image. This segmentation is based on thresholding using the Hue and Saturation from the HSV colour space, and is shown in Table 9 below.

TABLE 9

| Threshold Criterion | Binary Image Pixel Value |
| --- | --- |
| Pixel with both Hue H in the range 282–356 degrees (scale 0 to 360), and Saturation S in the range 0.2 to 0.24 (scale 0 to 1) | Set pixel to 1 |
| Pixel with either Hue outside the range 282–356 degrees, and/or Saturation outside the range 0.2–0.24 | Set pixel to 0 |

This produces a segmented binary image in which pixels set to 1 are processed further and those set to 0 are discarded.

The next stage 104 is to apply connected component labelling (as defined previously) to the segmented binary image: this provides a binary image with regions of contiguous pixels equal to 1, the regions being uniquely labelled for further processing and their areas being determined. The labelled binary image is then spatially filtered to remove small connected components (image regions with less than 10 pixels) which have insufficient pixels to contribute to vascularity: this provides a reduced binary image.

The sum of the area of the remaining image regions in the reduced binary image is then determined at 106 from the results of connected component labelling, and this sum is then expressed as a percentage of the area of the whole image. This procedure is carried out for each of the original RGB images separately to provide three such percentage area values: the average of the three percentage area values is computed, and it represents an estimate of the percentage of the area of a tissue sample occupied by blood vessels—i.e. the sample vascularity.

As set out in Table 10 below, vascularity is determined to be high or low depending on whether or not it is equal to at least 31%.

TABLE 10

| Description of vascularity | Range |
| --- | --- |
| High | 31%–100% |
| Low | 0%–30% |

High vascularity corresponds to relatively fast tumour growth because tumour blood supply has been facilitated, and early treatment is indicated. Low vascularity corresponds to relatively slow tumour growth, and early treatment is less important.

The procedures given in the foregoing description for calculating quantities and results can clearly be evaluated by an appropriate computer program recorded on a carrier medium and running on a conventional computer system. Such a program is straightforward for a skilled programmer to implement without requiring invention, because the mathematical expressions used are well known computational procedures. Such a program and system will therefore not be described.

The process steps described in the examples of all three inventions described herein are not all essential and alternatives may be provided. It is for example possible to omit a step of ignoring unsuitably small areas in selecting areas for later processing, if the consequent increase in processing burden is acceptable. The above examples are intended to provide an enabling disclosure, not to limit the invention.

The invention claimed is:

1. A method of measuring oestrogen or progesterone receptor (ER or PR) status having the steps of:
   a) obtaining histopathological specimen image data; and
   b) identifying in the image data groups of contiguous pixels corresponding to respective cell nuclei;
   c) deriving hue and saturation for the image data in a colour space having a hue coordinate and a saturation coordinate;
   d) thresholding the image data on the basis of hue and saturation and identifying pixels corresponding to cells which are preferentially stained relative to surrounding specimen tissue; and
   e) determining ER or PR status from at least one of a proportion of pixels corresponding to preferentially stained cells and a normalized average saturation.

2. A method according to claim 1 wherein step c) is implemented by transforming the image data into a chromaticity space, and deriving hue and saturation from image pixels and a reference colour.

3. A method according to claim 2 wherein hue is obtained from an angle $\phi$ equal to $$\sin^{-1}\frac{|\tilde{x}y - x\tilde{y}|}{\sqrt{\tilde{x}^2 + \tilde{y}^2}\sqrt{x^2 + y^2}}$$

and saturation from an expression $$\frac{x\tilde{x} + y\tilde{y}}{\tilde{x}^2 + \tilde{y}^2},$$

where (x, y) and ($\tilde{x}$, $\tilde{y}$) are respectively image pixel coordinates and reference colour coordinates in the chromaticity space.

4. A method according to claim 2 wherein hue is adapted to lie in the range 0 to 90 degrees and a hue threshold of 80 degrees is set in step d).

5. A method according to claim 2 wherein a saturation threshold $S_0$ is set in step d), $S_0$ being 0.9 for saturation in the range 0.1 to 1.9 and 0 for saturation outside this range.

6. A method according to claim 1 wherein the fraction of pixels corresponding to preferentially stained cells is determined by counting the number of pixels having both saturation greater than a saturation threshold and hue modulus less than a hue threshold and expressing such number as a fraction of a total number of pixels in the image.

7. A method according to claim 6 wherein the scores for normalised average saturation and fraction of pixels corresponding to preferentially stained cells are added together to provide a measurement of ER or PR.

8. A method according to claim 1 wherein step e) is carried out by obtaining a score for normalised average saturation and a score for fraction of pixels corresponding to preferentially stained cells and adding the scores together.

9. A method according to claim 1 including measuring C-erb-2 status by the following steps:
   a) correlating window functions of different lengths with pixel sub-groups within the identified contiguous pixels groups to identify pixels associated with cell boundaries,
   b) computing brightness-related measures of cell boundary brightness and sharpness and brightness extent around cell boundaries from pixels corresponding to cell boundaries,
   c) comparing the brightness-related measures with predetermined equivalents obtained from comparison images associated with different values of C-erb-2, and
   d) assigning to the image data a C-erb-2 value which is that associated with the comparison image having brightness-related measures closest to those determined for the image data.

10. A method according to claim 1 including measuring vascularity by the following steps:
    a) deriving hue and saturation for the image data in a colour space having a hue coordinate and a saturation coordinate;
    b) producing a segmented image by thresholding the image data on the basis of hue and saturation;
    c) identifying in the segmented image groups of contiguous pixels; and
    d) determining vascularity from the total area of the groups of contiguous pixels which are sufficiently large to correspond to vascularity, such area being expressed as a proportion of the image data's total area.

11. A method of measuring C-erb-2 status having the steps of:
    a) obtaining histopathological specimen image data; and
    b) identifying in the image data contiguous pixel groups corresponding to respective cell nuclei associated with surrounding cell boundary staining;
    c) correlating window functions of different lengths with pixel sub-groups within the identified contiguous pixels groups to identify pixels associated with cell boundaries,
    d) computing brightness-related measures of cell boundary brightness and sharpness and brightness extent around cell boundaries from pixels corresponding to cell boundaries,
    e) comparing the brightness-related measures with predetermined equivalents obtained from comparison images associated with different values of C-erb-2, and
    f) assigning to the image data a C-erb-2 value which is that associated with the comparison image having brightness-related measures closest to those determined for the image data.

12. A method according to claim 11 including identifying pixels associated with a cell boundary from a maximum correlation with a window function having a length which provides an estimate of cell boundary width.

13. A method according to claim 11 wherein a brightness-related measure of cell boundary brightness and sharpness is computed in step d) using a calculation including dividing cell boundaries by their respective widths to provide normalised boundary magnitudes, selecting a fraction of the normalised boundary magnitudes each greater than unselected equivalents and summing the normalised boundary magnitudes of the selected fraction.

14. A method according to claim 13 wherein the step of computing a brightness-related measure of brightness extent around cell boundaries is implemented using a calculation including dividing normalised boundary magnitudes into different magnitude groups each associated with a respective range of magnitudes, providing a respective magnitude sum of normalised boundary magnitudes for each magnitude group, and subtracting a smaller magnitude sum from a larger magnitude sum.

15. A method according to claim 14 wherein the comparison image having brightness-related measures closest to those determined for the image data is determined from a Euclidean distance between the brightness-related measures of the comparison image and the image data.

16. A method according to claim 11 wherein the step of identifying in the image data contiguous pixel groups corresponding to respective cell nuclei is carried out by an adaptive thresholding technique arranged to maximise the number of contiguous pixel groups identified.

17. A method according to claim 16 wherein the image data includes red, green and blue image planes and the adaptive thresholding technique includes:
 a) generating a mean value $\mu_R$ and a standard deviation $\sigma_R$ for pixels in the red image plane,
 b) generating a cyan image plane from the image data and calculating a mean value $\mu_C$ for its pixels,
 c) calculating a product $CMM\mu_C$ where CMM is a predetermined multiplier,
 d) calculating a quantity $R_B$ equal to the number of adjacent linear groups of pixels of predetermined length and including at least one cyan pixel which is less than $CMM\mu_C$,
 e) for each red pixel calculating a threshold equal to $\{RMM\mu_R - \sigma_R(4-R_B)\}$ and RMM is a predetermined multiplier,
 f) forming a thresholded red image by discarding each red pixel that is greater than or equal to the threshold,
 g) determining the number of contiguous pixel groups in the thresholded red image,
 h) changing the values of RMM and CMM and iterating steps c) to g), i) changing the values of RMM and CMM once more and iterating steps c) to g),
 j) comparing the numbers of contiguous pixel groups determined in steps g) to i), treating the three pairs of values of RMM and CMM as points in a two dimensional space, selecting the pair of values of RMM and CMM associated with the lowest number of contiguous pixel groups, obtaining its reflection in the line joining the other two pairs of values of RMM and CMM, using this reflection as a new pair of values of RMM and CMM and iterating steps c) to g) and this step j).

18. A method according to claim 17 including prior to step g) removing brown pixels from the thresholded red image if like-located pixels in the cyan image are less than $CMM\mu_C$.

19. A method according to claim 17 including prior to step g) forming an edge-filtered cyan image, generating a standard deviation $\sigma_C$ for its pixels and removing edge pixels from the thresholded red image if like-located pixels in the Sobel-filtered cyan image are greater than $(\mu_C + 1.5\sigma_C)$.

20. A method according to claim 17 including prior to step g) removing pixels corresponding to lipids from the thresholded red image if their red green and blue pixel values are all greater than the sum of the relevant colour's minimum value and 98% of its range of pixel values in each case.

21. A method according to claim 17 including prior to step g) subjecting the thresholded red image to a morphological closing operation.

22. A method of measuring vascularity having the steps of:
 a) obtaining histopathological specimen image data;
 the method also including the steps of:
 b) deriving hue and saturation for the image data in a colour space having a hue coordinate and a saturation coordinate;
 c) producing a segmented image by thresholding the image data on the basis of hue and saturation; and
 d) identifying in the segmented image groups of contiguous pixels; and
 e) determining vascularity from the total area of the groups of contiguous pixels which are sufficiently large to correspond to vascularity, such area being expressed as a proportion of the image data's total area.

23. A method according to claim 22 wherein the image data comprises pixels with red, green and blue values designated R, G and B respectively, wherein a respective saturation value S is derived in step b) for each pixel by:
 i) defining M and m for each pixel as respectively the maximum and minimum of R, G and B; and
 ii) setting S to zero if m equals zero and setting S to (M−m)/M otherwise.

24. A computer program for measuring ER or PR status incorporating program code for controlling computer apparatus to execute the steps of:
 a) processing histopathological specimen image data to identify in the image data groups of contiguous pixels corresponding to respective cell nuclei;
 b) deriving hue and saturation for the image data in a colour space having a hue coordinate and a saturation coordinate;
 c) thresholding the image data on the basis of hue and saturation and identifying pixels corresponding to cells which are preferentially stained relative to surrounding specimen tissue; and
 d) determining ER or PR status from at least one of a proportion of pixels corresponding to preferentially stained cells and a normalized average saturation.

25. A computer program for use in measuring C-erb-2 status incorporating program code for controlling computer apparatus to execute the steps of:
 a) processing histopathological specimen image data to identify contiguous pixel groups corresponding to respective cell nuclei associated with surrounding cell boundary staining;
 b) correlating window functions of different lengths with pixel sub-groups within the identified contiguous pixels groups to identify pixels associated with cell boundaries,
 c) computing brightness-related measures of cell boundary brightness and sharpness and brightness extent around cell boundaries from pixels corresponding to cell boundaries,
 d) comparing the brightness-related measures with predetermined equivalents obtained from comparison images associated with different values of C-erb-2, and e) assigning to the image data a C-erb-2 value which is that associated with the comparison image having brightness-related measures closest to those determined for the image data.

26. A computer program for use in measuring vascularity arranged to control computer apparatus to execute the steps of:
   a) using histopathological specimen image data to derive hue and saturation for the image data in a colour space having a hue coordinate and a saturation coordinate;
   b) producing a segmented image by thresholding the image data on the basis of hue and saturation; and
   c) identifying in the segmented image groups of contiguous pixels; and
   d) determining vascularity from the total area of the groups of contiguous pixels which are sufficiently large to correspond to vascularity, such area being expressed as a proportion of the image data's total area.

27. A computer program according to claim 26 wherein the image data comprises pixels with red, green and blue values designated R, G and B respectively, and a respective saturation value S is derived in step b) for each pixel by:
   i) defining M and m for each pixel as respectively the maximum and minimum of R, G and B; and
   ii) setting S to zero if m equals zero and setting S to $(M-m)/M$ otherwise.

28. A computer program according to claim 27 wherein hue values designated H are derived by:
   a) defining new values newr, newg and newb for each pixel given by $newr=(M-R)/(M-m)$, $newg=(M-G)/(M-m)$ and $newb=(M-B)/(M-m)$ in order to convert each pixel value into the difference between its magnitude and that of the maximum of the three colour magnitudes of that pixel, this difference being divided by the difference between the maximum and minimum of R, G and B, and
   b) calculating H as tabulated immediately below:

| M | H |
|---|---|
| 0 | 180 |
| R | 60(newb − newg)* |
| G | 60(2 + newr − newb)* |
| B | 60(4 + newg − newr)* |

*provided that if H proves to be >360, then 360 is subtracted from it, and if H proves to be <0, 360 is added to it.

29. Apparatus for measuring ER or PR status including means for photographing histopathological specimens to provide image data and computer apparatus to process the image data, the computer apparatus being programmed to identify in the image data groups of contiguous pixels corresponding to respective cell nuclei, the computer apparatus also being programmed to execute the steps of:
   a) deriving hue and saturation for the image data in a colour space having a hue coordinate and a saturation coordinate;
   b) thresholding the image data on the basis of hue and saturation and identifying pixels corresponding to cells which are preferentially stained relative to surrounding specimen tissue; and
   c) determining ER or PR status from at least one of a proportion of pixels corresponding to preferentially stained cells and a normalized average saturation.

30. Apparatus for measuring C-erb-2 status including means for photographing histopathological specimens to provide image data and computer apparatus to process the image data, the computer apparatus being programmed to execute the steps of:
   a) identifying in the image data groups of contiguous pixels corresponding to respective cell nuclei,
   b) correlating window functions of different lengths with pixel sub-groups within the identified contiguous pixels groups to identify pixels associated with cell boundaries,
   c) computing brightness-related measures of cell boundary brightness and sharpness and brightness extent around cell boundaries from pixels corresponding to cell boundaries,
   d) comparing the brightness-related measures with predetermined equivalents obtained from comparison images associated with different values of C-erb-2, and
   e) assigning to the image data a C-erb-2 value which is that associated with the comparison image having brightness-related measures closest to those determined for the image data.

31. Apparatus for measuring vascularity including means for photographing histopathological specimens to provide image data and computer apparatus programmed to execute the steps of:
   a) processing the image data;
   b) deriving hue and saturation for the image data in a colour space having a hue coordinate and a saturation coordinate;
   c) producing a segmented image by thresholding the image data on the basis of hue and saturation; and
   d) identifying in the segmented image groups of contiguous pixels; and
   e) determining vascularity from the total area of the groups of contiguous pixels which are sufficiently large to correspond to vascularity, such area being expressed as a proportion of the image data's total area.

* * * * *